US011526358B2

(12) United States Patent
Price et al.

(10) Patent No.: US 11,526,358 B2
(45) Date of Patent: Dec. 13, 2022

(54) DETERMINISTIC EXECUTION REPLAY FOR MULTICORE SYSTEMS

(71) Applicant: Raytheon Company, Waltham, MA (US)

(72) Inventors: Gregory Price, Silver Spring, MD (US); William Wysocki, Ellicott City, MD (US); Matthew A. Taylor, San Antonio, TX (US)

(73) Assignee: Raytheon Company, Waltham, MA (US)

( * ) Notice: Subject to any disclaimer, the term of this patent is extended or adjusted under 35 U.S.C. 154(b) by 122 days.

(21) Appl. No.: 17/021,206

(22) Filed: Sep. 15, 2020

(65) Prior Publication Data

US 2021/0109757 A1   Apr. 15, 2021

Related U.S. Application Data

(60) Provisional application No. 62/915,220, filed on Oct. 15, 2019.

(51) Int. Cl.
*G06F 9/38* (2018.01)
*G06F 9/455* (2018.01)
*G06F 9/52* (2006.01)

(52) U.S. Cl.
CPC ........ *G06F 9/3838* (2013.01); *G06F 9/45558* (2013.01); *G06F 9/522* (2013.01)

(58) Field of Classification Search
None
See application file for complete search history.

(56) References Cited

U.S. PATENT DOCUMENTS

| | | | | |
|---|---|---|---|---|
| 5,953,736 | A | * | 9/1999 | O'Connor ........... G06F 12/0276 |
| | | | | 711/E12.012 |
| 6,832,367 | B1 | * | 12/2004 | Choi ................... G06F 11/3664 |
| | | | | 717/124 |

(Continued)

FOREIGN PATENT DOCUMENTS

CN    106033368    10/2016

OTHER PUBLICATIONS

Liu, et al., "DTHREADS: Efficient Deterministic Multithreading;" Proceedings of the 23$^{rd}$ ACM Symposium on Operating System Principles; Oct. 23, 2011; 14 Pages.

(Continued)

*Primary Examiner* — Hyun Nam
(74) *Attorney, Agent, or Firm* — Daly, Crowley, Mofford & Durkee, LLP

(57) ABSTRACT

Techniques are disclosed for interposing on nondeterministic events during multicore virtual machine (VM) execution to capture information that allows for deterministically recreating the nondeterministic events during execution replay of the VM. A method may include reading, by a virtual processor running within a multicore VM instance, an instruction to execute, and, responsive to a determination that the instruction is a nondeterministic instruction, interposing on the nondeterministic instruction execution so as to allow deterministic execution of the nondeterministic instruction during replay execution of the multicore VM instance. Interposing on the nondeterministic instruction execution may include recording a partial barrier event and/or a full barrier event. The nondeterministic instruction may be a read memory access instruction or a write memory access instruction.

20 Claims, 16 Drawing Sheets

(56) References Cited

U.S. PATENT DOCUMENTS

| | | | |
|---|---|---|---|
| 8,832,682 B2 | 9/2014 | Xu et al. | |
| 9,436,471 B2 | 9/2016 | Malyugin et al. | |
| 10,908,935 B1* | 2/2021 | Taylor | G06F 9/45558 |
| 2002/0029357 A1* | 3/2002 | Charnell | G06F 9/4484 |
| | | | 712/E9.082 |
| 2002/0038332 A1* | 3/2002 | Alverson | G06F 9/4812 |
| | | | 718/107 |
| 2009/0119493 A1* | 5/2009 | Venkitachalam | G06F 9/45558 |
| | | | 718/1 |
| 2009/0249049 A1* | 10/2009 | Weissman | G06F 9/455 |
| | | | 712/238 |
| 2011/0029821 A1* | 2/2011 | Chow | G06F 11/3495 |
| | | | 714/45 |
| 2011/0078666 A1* | 3/2011 | Altekar | G06F 11/3636 |
| | | | 717/131 |
| 2015/0207780 A1* | 7/2015 | Grier | H04L 63/0407 |
| | | | 726/26 |
| 2019/0121659 A1* | 4/2019 | Van Riel | G06F 9/4843 |
| 2021/0064512 A1* | 3/2021 | Sirov | G06F 9/30058 |
| 2021/0294656 A1* | 9/2021 | Tomic | G06F 9/5005 |

OTHER PUBLICATIONS

Cooperman, et al., "DMTCP: Distributed MultiThreaded CheckPointing;" Downloaded from http://dmtcp.sourceforge.net/; Aug. 14, 2019; 7 Pages.

Chen, et al., "Deterministic Replay: A Survey;" ACM Computing Surveys, vol. 48, No. 2, Article 17; Sep. 2015; 47 pages.

PCT International Search Report and Written Opinion dated Feb. 2, 2021 for International Application No. PCT/US2020/055354; 18 pages.

* cited by examiner

DETERMINISTIC EXECUTION REPLAY FOR MULTICORE SYSTEMS

CROSS-REFERENCE TO RELATED APPLICATION

This application claims the benefit of and priority to U.S. Provisional Application No. 62/915,220, filed on Oct. 15, 2019, which is herein incorporated by reference in its entirety.

BACKGROUND

Hardware virtualization is the abstraction of computing resources from the software that uses them. Virtualization is performed on a given hardware platform by a host control program (i.e., an emulator or virtual machine monitor (VMM)/hypervisor), which creates an abstraction layer between the underlying hardware and the software. Once a hypervisor is in place, it provides a simulated computing environment, commonly known as a virtual machine (VM), for its guest software. In typical applications, multiple VMs run (i.e., execute) simultaneously on the same physical machine, sharing the hardware resources among them, thus reducing investment and operating costs. However, each VM runs its own operating system and/or software applications and, thus, is logically separated from every other VM.

Replay debugging in a virtualization system allows for debugging an application in a recording of a virtual machine execution. Replay debugging mode is different from a remote debugging mode in that replay debugging requires creating a recording of an application's execution in order to replay debug the application.

In order to facilitate replay debugging, a virtual machine replay system, at the highest level, captures nondeterministic events in order to reproduce those events during execution replay. In a single processor system, the scope of the nondeterministic events include access to any external resource such as system timers, hard drives, and networks, for example. In a multicore system, memory accesses also become nondeterministic events due to the potential for two system cores accessing the same memory address concurrently. This may be an issue during execution replay because it may not be possible to know which processor actually accessed the memory address in such a situation. Therefore, the replay may differ from the original execution due to missing this nondeterministic event.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a computer-implemented method may include starting an execution replay of a multicore virtual machine (VM) instance that was previously executed, the multicore VM instance including a plurality of virtual processors, at least one virtual processor of the virtual processors configured to execute instructions in an instruction stream, and initializing states of the plurality of virtual processors. The computer-implemented method may also include, by the at least one virtual processor, reading a barrier event generated by the at least one virtual processor during a previous execution of the multicore VM instance, wherein the barrier event specifies at least one constraint and a block instruction counter value, and executing one or more instructions in the instruction stream based on at least one of: the at least one constraint or the block instruction counter value.

In one aspect, executing the one or more instructions in the instruction stream based on at least one of the at least one constraint or the block instruction counter value may include executing one or more instructions in the instruction stream until the block instruction counter value is reached, ceasing execution of instructions in the instruction stream until the at least one constraint is satisfied, and responsive to the at least one constraint being satisfied, executing a next instruction in the instruction stream.

In one aspect, the computer-implemented method may also include, upon executing the next instruction, reading a next barrier event generated by the at least one virtual processor during the previous execution of the multicore VM instance.

In one aspect, the next instruction may be a nondeterministic instruction.

In one aspect, the barrier event may be recorded during execution of a nondeterministic instruction during the previous execution of the multicore VM instance.

In one aspect, the nondeterministic instruction may be a read memory access instruction.

In one aspect, the nondeterministic instruction may be a write memory access instruction.

In one aspect, the execution replay of the VM instance may be in an emulation execution environment.

In one aspect, the barrier event may be a partial barrier event.

In one aspect, the barrier event may be a full barrier event.

According to another illustrative embodiment provided to illustrate the broader concepts described herein, a computer-implemented method may include starting an execution of a multicore virtual machine (VM) instance, the multicore VM instance including a plurality of virtual processors, at least one virtual processor of the virtual processors configured to execute instructions in an instruction stream. The computer-implemented method may also include, by the at least one virtual processor, reading an instruction to execute, and responsive to a determination that the instruction is a nondeterministic instruction, interposing on the nondeterministic instruction execution so as to allow deterministic execution of the nondeterministic instruction during replay execution of the multicore VM instance.

In one aspect, the execution of the VM instance may be in an emulation execution environment.

In one aspect, the nondeterministic instruction may be a read memory access instruction on a virtual memory block, and wherein interposing on the nondeterministic instruction execution may further comprise acquiring shared access rights to the virtual memory block.

In one aspect, acquiring shared access rights to the virtual memory block may comprise recording a partial barrier event, wherein the partial barrier event may include an indication of a time at which the virtual processor is to be blocked during execution replay of the multicore VM instance.

In one aspect, the nondeterministic instruction may be a write memory access instruction on a virtual memory block, and wherein interposing on the nondeterministic instruction execution may further comprise acquiring exclusive access rights to the virtual memory block.

In one aspect, acquiring exclusive access rights to the virtual memory block may comprise recording a partial barrier event, wherein the partial barrier event may include an indication of a time at which the virtual processor is to be blocked during execution replay of the multicore VM instance.

In one aspect, acquiring exclusive access rights to the virtual memory block may comprise recording a full barrier event, wherein the full barrier event may include an indication of a time at which the virtual processor is to be blocked during execution replay of the multicore VM instance.

According to another illustrative embodiment provided to illustrate the broader concepts described herein, a system includes one or more non-transitory machine-readable mediums configured to store instructions, and one or more processors configured to execute the instructions stored on the one or more non-transitory machine-readable mediums. Execution of the instructions may cause the one or more processors to: start an execution replay of a multicore virtual machine (VM) instance that was previously executed, the multicore VM instance including a plurality of virtual processors, at least one virtual processor of the virtual processors configured to execute instructions in an instruction stream, and initialize states of the plurality of virtual processors. Execution of the instructions may also cause the at least one virtual processor to: read a barrier event generated by the at least one virtual processor during a previous execution of the multicore VM instance, wherein the barrier event specifies at least one constraint and a block instruction counter value, and execute one or more instructions in the instruction stream based on at least one of: the at least one constraint or the block instruction counter value.

In one aspect, to execute the one or more instructions in the instruction stream based on at least one of the at least one constraint or the block instruction counter value may include execute one or more instructions in the instruction stream until the block instruction counter value is reached, cease execution of instructions in the instruction stream until the at least one constraint is satisfied, and responsive to the at least one constraint being satisfied, execute a next instruction in the instruction stream.

According to another illustrative embodiment provided to illustrate the broader concepts described herein, a system includes one or more non-transitory machine-readable mediums configured to store instructions, and one or more processors configured to execute the instructions stored on the one or more non-transitory machine-readable mediums. Execution of the instructions may cause the one or more processors to: start an execution of a multicore virtual machine (VM) instance, the multicore VM instance including a plurality of virtual processors, at least one virtual processor of the virtual processors configured to execute instructions in an instruction stream. Execution of the instructions may also cause the at least one virtual processor to: read an instruction to execute, and responsive to a determination that the instruction is a nondeterministic instruction, interpose on the nondeterministic instruction execution so as to allow deterministic execution of the nondeterministic instruction during replay execution of the multicore VM instance.

In accordance with another illustrative embodiment provided to illustrate the broader concepts described herein, a computer program product includes one or more non-transitory machine-readable mediums encoding instructions that when executed by one or more processors cause a process to be carried out. The process may include starting an execution replay of a multicore virtual machine (VM) instance that was previously executed, the multicore VM instance including a plurality of virtual processors, at least one virtual processor of the virtual processors configured to execute instructions in an instruction stream, and initializing states of the plurality of virtual processors. The process may also include, by the at least one virtual processor, reading a barrier event generated by the at least one virtual processor during a previous execution of the multicore VM instance, wherein the barrier event specifies at least one constraint and a block instruction counter value, executing one or more instructions in the instruction stream until the block instruction counter value is reached, ceasing execution of instructions in the instruction stream until the at least one constraint is satisfied, and responsive to the at least one constraint being satisfied, executing a next instruction in the instruction stream.

In accordance with another illustrative embodiment provided to illustrate the broader concepts described herein, a computer program product includes one or more non-transitory machine-readable mediums encoding instructions that when executed by one or more processors cause a process to be carried out. The process may include starting an execution of a multicore virtual machine (VM) instance, the multicore VM instance including a plurality of virtual processors, at least one virtual processor of the virtual processors configured to execute instructions in an instruction stream. The process may also include, by the at least one virtual processor, reading an instruction to execute, and responsive to a determination that the instruction is a nondeterministic instruction, interposing on the nondeterministic instruction execution so as to allow deterministic execution of the nondeterministic instruction during replay execution of the multicore VM instance.

According to another illustrative embodiment provided to illustrate the broader concepts described herein, a system includes means for starting an execution replay of a multicore virtual machine (VM) instance that was previously executed, the multicore VM instance including a plurality of virtual processors, at least one virtual processor of the virtual processors configured to execute instructions in an instruction stream, and means for initializing states of the plurality of virtual processors. The system also includes means for reading a barrier event generated by the at least one virtual processor during a previous execution of the multicore VM instance, wherein the barrier event specifies at least one constraint and a block instruction counter value, and means for executing one or more instructions in the instruction stream based on at least one of: the at least one constraint or the block instruction counter value.

According to another illustrative embodiment provided to illustrate the broader concepts described herein, a system includes means for starting an execution of a multicore virtual machine (VM) instance, the multicore VM instance including a plurality of virtual processors, at least one virtual processor of the virtual processors configured to execute instructions in an instruction stream, and means for reading an instruction to execute. The system also includes means for, responsive to a determination that the instruction is a nondeterministic instruction, interposing, by the at least one virtual processor, on the nondeterministic instruction execution so as to allow deterministic execution of the nondeterministic instruction during replay execution of the multicore VM instance.

Figure 1:
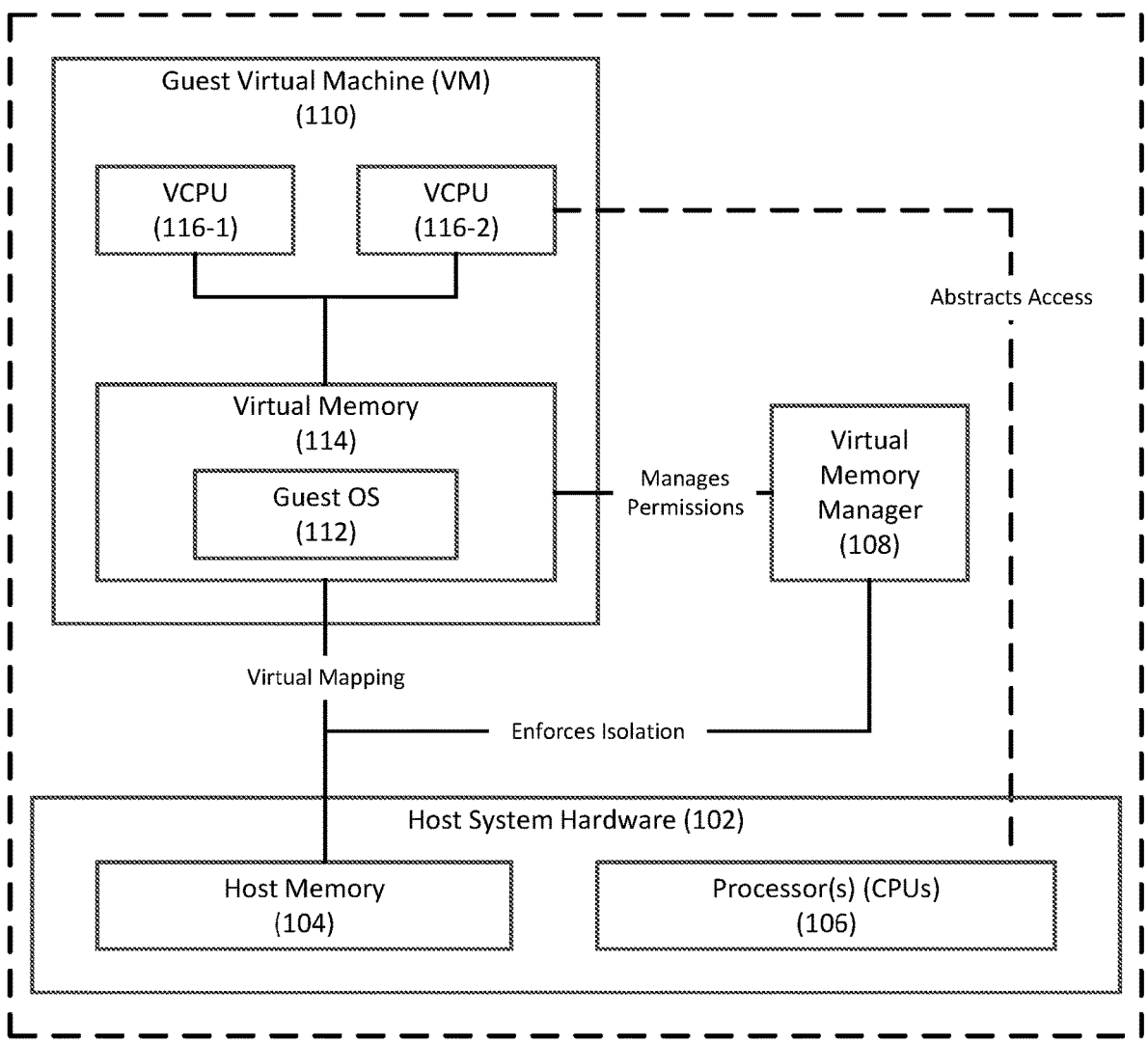
FIG. 1 is a block diagram illustrating selective components of an example virtualization system providing a virtual memory manager, in accordance with an embodiment of the present disclosure.

These and other features of the present embodiments will be understood better by reading the following detailed description, taken together with the figures herein described.

DETAILED DESCRIPTION

In accordance with the various embodiments of the present disclosure, techniques are disclosed for interposing on nondeterministic events (sometimes referred to herein as a "nondeterministic instruction" in the singular form) during multicore virtual machine (VM) execution to capture information that allows for deterministically recreating the nondeterministic events during execution replay (sometimes referred to herein as "replay mode" or more simply as "replay") of the VM. The collected information allows for recreating a particular ordering during replay, thus making the replay deterministic. In multicore systems, accesses to shared resources, such as memory and peripheral devices (e.g., such as timers, external video cards, etc.) that interact directly with memory are nondeterministic due to the potential for two system cores (processors) accessing the same shared resource concurrently. That is, with respect to nondeterminism, the result of a nondeterministic event is not known at the time of attempting to perform the nondeterministic event. In some embodiments, the various concepts, systems, and techniques described herein may be implemented in an emulation execution environment in which, for example, an emulator may be configured to emulate or otherwise provide the hypervisor functionality. In other embodiments, the various concepts, systems, and techniques described herein may be implemented in a hardware acceleration execution environment, for example, by a hypervisor.

In some embodiments, ordering constraints (i.e., the constraints to recreate the ordering during replay) may be implemented by generating partial barrier events and/or full barrier events. A partial barrier event blocks a first processor (e.g., a first virtual processor) until a second processor (e.g., second virtual processor) reaches or passes a specified point in its replay. A full barrier event blocks one processor until every other processor reaches or passes a respective specified point in their replay. To this end, partial barrier events and full barrier events may be generated during live execution (sometimes referred to herein as "live mode" or "live execution") for use during replay to impose a particular acquisition order for the nondeterministic events. The imposed acquisition order recreates the ordering that deterministically recreates the nondeterministic events during replay. In this way, the partial barrier events and full barrier events generated during live execution provide a form of coordinated checkpointing during replay, which allows for maintaining determinism during replay.

Although certain embodiments and/or examples are described herein in the context of memory accesses, it will be appreciated in light of this disclosure that such embodiments and/or examples are not restricted to memory accesses but are applicable to nondeterministic events in the general sense, and this disclosure should not be construed as limited in this regard. These and other advantages and alternative embodiments will be apparent in light of this disclosure.

FIG. 1 is a block diagram illustrating selective components of an example virtualization system 100, in accordance with an embodiment of the present disclosure. In brief, virtualization system 100 may provide the provisioned virtual processors an "abstracted interface" to the underlying hardware. For example, in the case of an emulator implementation of virtualization system 100 (e.g., in an emulation execution environment), the emulator may translate guest instructions to host instructions and execute the translated instructions. In the case of a hypervisor implementation of virtualization system 100 (e.g., in an hardware acceleration execution environment), virtualization system 100 may provide the host hardware directly to the provisioned VMs, but may lock down certain interfaces (such as, but not limited to, limiting access to host memory or peripherals). More specifically, virtualization system 100 illustrated in FIG. 1 can be understood as enabling interposition on nondeterministic events (i.e., nondeterministic instructions) during live multicore VM execution to capture information that allows for deterministic recreation of the nondeterministic events during VM replay. As shown in FIG. 1, virtualization system 100 includes a host system hardware 102, which further includes a host memory 104 and one or more processors or central processing units (CPUs) 106. In general, host system hardware 102 provides the physical system resources for virtualization system 100. To this end, in some implementations, host system hardware 102 may also include one or more physical devices (e.g., input/output (I/O) devices), one or more physical disks (e.g., internal and/or external hard disks), and one or more network interface cards (NICs), to provide a few examples.

Host memory 104 may include computer-readable storage media configured for carrying or having computer-executable instructions or data structures stored thereon. Such computer-readable storage media may include any available media that may be accessed by a general-purpose or special-purpose computer, such as processor 106. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. In some implementations, host memory 104 may also include any type of computer-readable storage media configured for short-term or long-term storage of data, such as, a hard drive, solid-state drive, Read-Only Memory (ROM), Electrically Erasable Programmable Read-Only Memory (EEPROM), a redundant array of independent disks (RAID), Compact Disc Read-Only Memory (CD-ROM) or other optical disk storage, magnetic disk storage or other magnetic storage devices, flash memory devices (e.g., solid state memory devices), or any other storage medium. Combinations of the above may also be included within the scope of computer-readable storage media. Host memory 104 may store firmware, data, programs, and executable instructions, which may be executed by one or more processors 106.

Processor 106 may include any suitable special-purpose or general-purpose computer, computing entity, or computing or processing device including various computer hardware, or firmware, and may be configured to execute instructions, such as program instructions, stored on any applicable computer-readable storage media, such as host memory 104, for instance. For example, processor 106 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi-core, or any other digital or analog circuitry configured to interpret and/or to execute program instructions and/or to process data, whether loaded from memory or implemented directly in hardware. Although illustrated as a single processor in FIG. 1, processor 106 may include any number of processors and/or processor cores configured to, individually or collectively, perform or direct performance of any number of operations described in the present disclosure. Processor 106 may include one or more coprocessors or controllers, such as an audio processor or a graphics processing unit, to assist in its processing operations. In an embodiment, processor 106 includes one or more multicore processors.

Processor 106 may include processor registers suitable for storing various types of data. For example, the processor registers can store data, instructions, numeric values, floating point values, conditional values, truth values, and/or addresses (e.g., addresses for locations in system memory), to name a few examples. Processor 106 can include special purpose registers used to store data and settings related to the processor itself (e.g., in model specific registers) and/or data associated with a running process, such as an instruction pointer, instruction counter, and/or a memory stack pointer.

In some embodiments, virtualization system 100 can be configured to provision one or more guest VMs, such as one or more guest VMs 110 as shown in FIG. 1. In general, virtual machines are based on computer architectures and provide a virtual view of the physical hardware, memory, processor, and other system resources available on a physical computing system. For example, virtualization system 100 can load a virtual machine image to generate guest VM 110. In an implementation, guest VM 110 can include a program (e.g., set of executable instructions) that, when executed by a processor, such as processor 106, emulates (e.g., imitates) the operation of a computing system. The emulation allows programs and processes to be executed in guest VM 110 in a manner similar to being executed on the computing system being emulated. While only one VM 110 is depicted in FIG. 1 for purposes of clarity, it will be appreciated that virtualization system 100 can provision any number of virtual machines (e.g., virtualization system 100 can host any number of VMs 110).

In some embodiments, the provisioned VMs can be configured to provide similar virtual views of the physical hardware, memory, processor, and other system resources available to the VMs. In some embodiments, some provisioned VMs may provide virtual views of the physical hardware, memory, processor, and other system resources that are distinct (e.g., a virtual view that is specific to a VM) to the VM. In any case, the virtual view provided by a VM can be based on, for example, VM permissions, application of policy rules, the user accessing the VM, the applications that are to run on the VM, networks to be accessed by the VM, or any other desired criteria.

Still referring to FIG. 1, guest VM 110 can include a guest operating system (OS) 112. For example, guest OS 112 may execute on a virtual processor within guest VM 110. Guest OS 112 may include any suitable operating system, such as Microsoft Windows®, Linux®, MacOS®, iOS®, or Android™, to provide a few examples. Guest OS 112 may provide users of guest VM 110, such as applications running within guest VM 110, access to resources that are being virtualized by guest VM 110. Such resources can include programs, applications, files, executable instruction codes, desktop environments, computing environment, or other resources made available to users by guest VM 110.

Guest VM 110 may implement a virtual memory 114, such that physical memory is mapped to a virtual memory area that may appear physically contiguous, for example. In brief, virtual memory 114 may provide a mapping of host memory such that the host memory may appear as a contiguous area of memory. In an implementation, the virtual memory mapping may extend beyond the memory (e.g., RAM) of the host system. For example, the virtual memory mapping may extend to external memory regions, such as, for example, memory backed by RAM on a graphics chip, as one example. Virtual memory 114 can correspond to, for example, memory or portions of the memory, such as host memory 104, of the host system. In this regard, virtual memory 114 may serve as physical memory for guest VM 110. The amount of virtual memory 114 that is allocated to guest VM 110 may depend on memory resource settings and contention for the host system memory, for example. As an example, assuming the host system includes 16 GB of RAM, virtualization system 100 may allocate the 16 GB of RAM to guest VM 110. Alternatively, virtualization system 100 may allocate a portion, for example, 2 GB, of the 16 GB of RAM to guest VM 110 and allocate some or all of the remaining 14 GB of RM to one or more other guest VMs. In some embodiments, the amount of memory allocated to guest VM 110 may exceed the memory of the host system. In such cases of "overcommit", the operating system may "swap out" the least recently used memory in each process to disk in order to allow usage of more memory than is truly (actually) available.

Guest VM 110 can include one or more virtual processors (also referred to herein as a "virtual CPU" or "VCPU" in the singular form for brevity). For example, as shown in FIG. 1, guest VM 110 may include two virtual processors, VCPU 116-1 and VCPU 116-2 (individually referred to herein as VCPU 116 or collectively referred to herein as VCPUs 116). VCPUs 116 may comprise a virtualized view of one or more processors 106 of virtualization system 100. The number of virtual processors that can be virtualized within a guest VM (e.g., guest VM 110) may be limited to the actual number of processor cores on the host system (e.g., cores in processors 106 in host system hardware 102). For example, if the host system includes 128 processor cores, then a guest VM may be configured to have up to 128 virtual CPUs. In hyperthreading environments (e.g., implementations where hyperthreading is supported and enabled on the host system), a guest VM may be configured to have one or more virtual CPUs up to two times the number of processor cores on the host system. In implementations that support scheduling (e.g., time-slicing), a guest VM may be configured to have any number of virtual CPUs. In other words, in environments where scheduling is performed, it may be possible to allocate and rune more VMs (e.g., virtual CPUs) than there are available processor cores.

In some embodiments, VCPUs 116 can have substantially the same characteristics as those of processor 106. In some embodiments, VCPUs 116 can provide a modified view of processor 106 such that at least some of the characteristics of VCPUs 116 are different from the characteristics of the corresponding processor 106. Additionally or alternatively, VCPUs 116 may provide additional functionality or characteristics that are not available in the corresponding processors 106. For example, VCPUs 116 may provide additional registers for use by guest VM 110. While only two virtual processors (e.g., VCPU 116-1 and VCPU 116-2) are depicted in FIG. 1 for purposes of clarity, it will be appreciated that guest VM 110 can be configured with a different number of virtual processors, such as one virtual processor, four virtual processors, eight virtual processors, or any suitable number of virtual processors based on the capabilities of the host system.

In some embodiments, VCPUs 116 in guest VM 110 may have page tables that map one or more blocks of memory (e.g., virtual memory 114) to virtual memory pages. For example, VCPU 116-1 may have its own page table and VCPU 116-2 may have its own page table. A page table may translate guest virtual addresses to machine physical addresses. Virtual processor page tables are further discussed below at least in conjunction with FIG. 2A, for example.

A virtual processor can execute instructions, such as a sequence of instructions of an application running in a VM. The instructions executed by the virtual processor may affect other aspects of the VM and/or the host system. For example, the instructions may access memory, read data from memory, write data to memory, read data from a connected device, write data to a connected device, or otherwise interact with a connected device. Note that a majority of the instructions executed by the virtual processor is deterministic in that, using the same input data and the same instruction, the same result will occur. In other words, the result of executing a deterministic instruction is known at the time of attempting to execute the instruction. However, in multicore systems in which one or more virtual processors may be provisioned, instructions that affect shared resources, such as memory (e.g., shared memory, or a physical memory page mapped to each respective virtual processor's (e.g., VCPU 116-1 and VCPU 116-2) virtual memory space), are nondeterministic. Accesses from multiple virtual processors to memory may interleave or occur in any arbitrary order. For example, reads from virtual memory by a first virtual processor may be affected by writes to the virtual memory by a second virtual processor. Since these reads and writes may occur in any order, the order of execution between the virtual processors need to be preserved to provide determinism during replay of such multicore systems.

In some embodiments, the number of virtual CPUs (e.g., VCPUs 116) in a virtual machine is less than the pages of RAM.

In accordance with certain of the embodiments disclosed herein, the ordering is preserved using partial barrier events and full barrier events. The partial barrier events and full barrier events allow for the recreation of memory acquisition ordering. A partial barrier event blocks a first virtual processor (e.g., VCPU 116-1) until a second virtual processor (e.g., VCPU 116-2) reaches or passes a specified point in its replay. A full barrier event blocks one virtual processor (e.g., VCPU 116-1) until every other virtual processor (e.g., every other VCPU provisioned in guest VM 110) reaches or passes a respective specified point in their replay. For example, in an implementation, a virtual processor (e.g., VCPU 116-1 and VCPU 116-2) wanting to acquire memory (e.g., access a block of virtual memory 114) may generate a partial barrier event or a full barrier event, depending on the type of memory access, to record the state transitions of the virtual processors. The generated barrier event (a partial barrier event or a full barrier event) provides a snapshot or record of the states of the virtual processors (e.g., VCPU 116-1 and VCPU 116-2) at a point approximate to the point at which an acquiring virtual CPU acquires the memory.

The barrier events (partial barrier events and full barrier events) can then be utilized during replay to recreate the state transitions (the ordering) of the virtual processors (e.g., VCPU 116-1 and VCPU 116-2) to make the nondeterministic event (e.g., memory acquisition) deterministic. In other words, the barrier events can be used during replay to impose an order between the virtual processors such that the virtual processors execute deterministically. The barrier events generated during live execution provide a form of coordinated checkpointing between the virtual processors during replay, which allows for maintaining determinism during replay.

Still referring to FIG. 1, virtualization system 100 includes a virtual memory manager 108. In brief, virtual memory manager 108 may enforce permissions on guest memory and enforce isolation of guest and host memory. To this end, in an embodiment, virtual memory manager 108 may be generally configured to facilitate interposition on nondeterministic events (e.g., accesses to virtual memory 114) during live VM execution to capture information that allows for deterministic recreation of the nondeterministic events during VM replay. The collected information allows for recreating a particular ordering during replay, thus making the replay deterministic. In some embodiments, each VCPU (e.g., VCPU 116-1 and VCPU 116-2) in virtualization system 100 may include a respective virtual memory manager 108. Virtual memory manager 108 is further described below at least in conjunction with FIGS. 2-6.

Figure 2A:
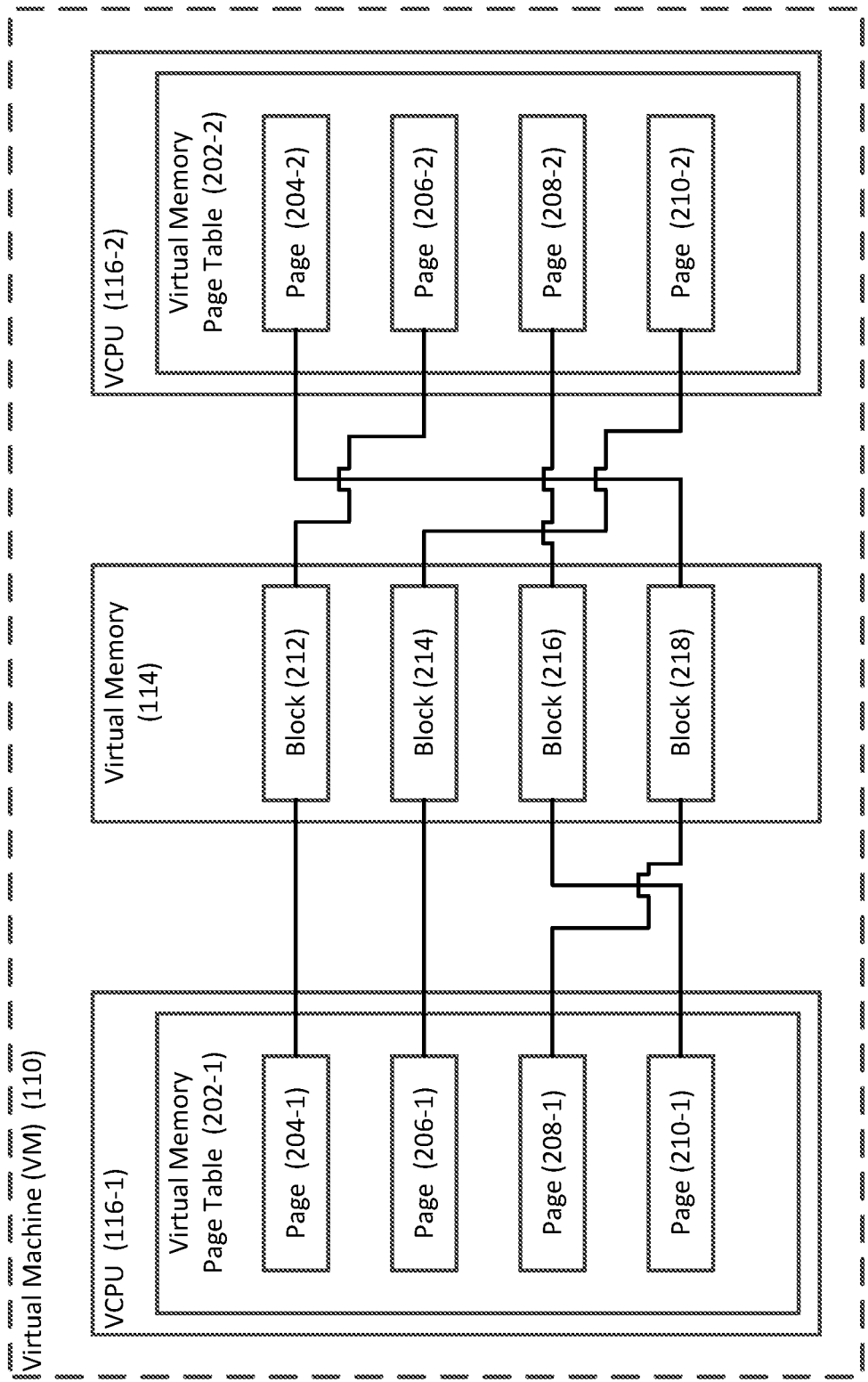
FIG. 2A is a block diagram illustrating example mappings of virtual memory page tables, in accordance with an embodiment of the present disclosure.

FIG. 2A is a block diagram illustrating example mappings of virtual memory page tables, in accordance with an embodiment of the present disclosure. A virtual processor of a guest VM may manage a virtual memory page table for a virtual address space of the guest VM. A virtual memory page table maps virtual memory to physical memory. In the example shown in FIG. 2A, VCPU 116-1 includes a virtual memory page table 202-1, and VCPU 116-2 includes a virtual memory page table 202-2. VCPU 116-1 may manage virtual memory page table 202-1 for virtual memory 114. Similarly, VCPU 116-2 may manage virtual memory page table 202-2 for virtual memory 114.

In order to provide efficient management of virtual memory 114, including the efficient detection of overlapping memory accesses, virtual memory 114 may be divided or otherwise separated into blocks (memory blocks), and accesses (reads and/or writes to memory addresses) within each particular block processed as nondeterministic events. In other words, accesses within a block may be treated as if the accesses are overlapped and, thus, need to be ordered or otherwise synchronized to provide the deterministic replay. In order to provide the ordering during replay, overlapping memory accesses within the same block during live execution may be recorded using partial barrier events and full barrier events.

In an implementation, as shown in the example of FIG. 2A, virtual memory 114 may be divided into four blocks 212, 214, 216, 218. The size of each block 212, 214, 216, 218 may be of 2 kibibytes (KiB), 4 KiB, or any other desired block size. In the case of four blocks 212, 214, 216, 218, virtual memory page table 202-1 may include four pages 204-1, 206-1, 208-1, 210-1, wherein page 204-1 may map to block 212, page 206-1 may map to block 214, page 208-1 may map to block 218, and page 210-1 may map to block 216. Similarly, virtual memory page table 202-2 may include four pages 204-2, 206-2, 208-2, 210-2, wherein page 204-2 may map to block 218, page 206-2 may map to block 212, page 208-2 may map to block 216, and page 210-2 may map to block 214. Note that the number of blocks depicted in virtual memory 114 is for illustration, and it will be appreciated that virtual memory 114 may be divided into different numbers of blocks. Also note that the mappings between the pages in the virtual memory page table and the virtual memory blocks are for purposes of illustration and that the mappings may differ and/or change during execution of the guest VM.

Figure 2B:
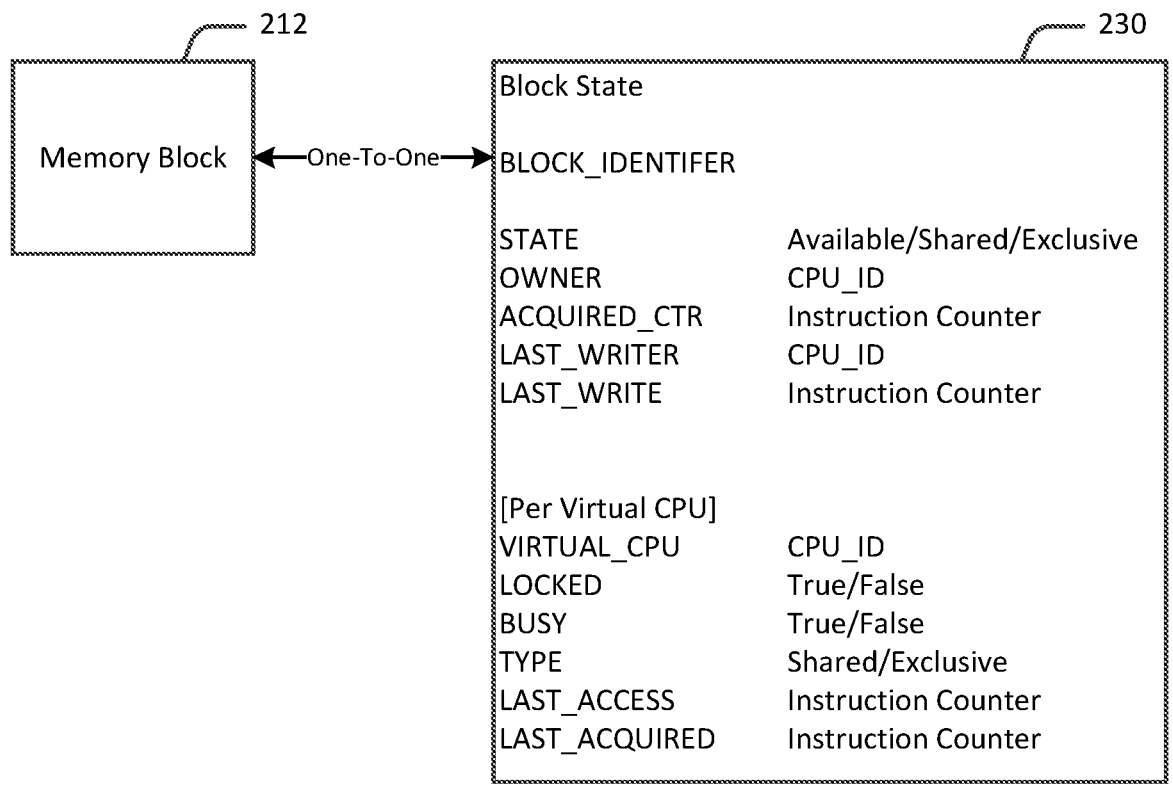
FIG. 2B illustrates an example block state data structure, in accordance with an embodiment of the present disclosure.

FIG. 2B illustrates an example block state data structure, in accordance with an embodiment of the present disclosure. In an embodiment, a virtualization system (e.g., virtualization system 100) may generate and maintain a block state data structure for each virtual memory block. The block state data structure may include information regarding the state of the associated virtual memory block and information regarding the virtual processors with respect to each virtual processor's interaction with the virtual memory block. The block state data structures may be used for processing accesses to virtual memory blocks by the virtual processors.

As shown in the example of FIG. 2B, a block state data structure 230 may be generated for block 212 of virtual memory 114. As described previously, respective block state data structures substantially similar to block state data structure 230 may be generated for each of blocks 214, 216, 218 of virtual memory 114. As can be seen, block state data structure 230 includes data values for a BLOCK_IDENTIFIER, a STATE, an OWNER, an ACQUIRED_CTR, a LAST_WRITER, and a LAST_WRITE. The BLOCK_IDENTIFIER identifies the memory block associated with the block state data structure. In this example case, BLOCK_IDENTIFIER identifies block 212.

The STATE indicates the current state of the associated memory block, which in this example case is block 212. In an implementation, the STATE may be set to a value that indicates 'Available', 'Shared', or 'Exclusive'. The STATE 'Available' indicates that no access rights or permissions are currently attached to block 212 (i.e., the memory block associated with the block state data structure). In other words, the STATE 'Available' indicates that no virtual processor, which in this example case may be VCPU 116-1 or VCPU 116-2, currently has any access rights to block 212, and that block 212 is currently available for access. The STATE 'Shared' indicates that shared access rights are currently attached to block 212. In the 'Shared' state, access to block 212 is currently assigned to one or more virtual processors, and that the one or more virtual processors has permissions to access block 212. The STATE 'Exclusive' indicates that exclusive access rights are currently attached to block 212. In the 'Exclusive' state, access to block 212 is currently assigned exclusively to one virtual processor, and that one virtual processor is the only virtual processor that has permissions to access block 212.

The OWNER identifies a current owner of block 212 (i.e., a virtual processor that has most recently acquired access to the block 212). The current owner may be specified using a CPU_ID that uniquely identifies the virtual processor. For example, if VCPU 116-1 is the virtual processor that most recently acquired access to block 212, the OWNER value is set to the CPU_ID of VCPU 116-1.

The ACQUIRED_CTR indicates an instruction counter value of the current owner (i.e., the virtual processor that is identified by the OWNER value) at which point in the execution of the instruction stream (e.g., at which time) the current owner acquired block 212. In other words, the ACQUIRED_CTR is the instruction counter value at which the virtual processor that currently owns block 212 was at when that particular virtual processor acquired block 212. The instruction counter value refers to a count (e.g., a singularly incrementing counter value) of the number of instructions executed by the virtual processor and is distinct from an address (i.e., the address of an instruction). In this respect, the instruction counter value provides a concept of time. Continuing the above example, suppose that VCPU 116-1 executed 1,000 instructions and then acquired access to block 212 (i.e., became the owner of block 212). In this example case, ACQUIRED_CTR is set to the value 1,000. In an embodiment, the count of the number of instructions executed by a virtual processor may be from the start of execution of the guest VM within which the virtual processor is running. In other words, the count is initialized at the start of execution of the guest VM and is incremented by one for each instruction executed by the virtual processor.

The LAST_WRITER identifies a virtual processor that last wrote to memory in block 212. The LAST_WRITER may be specified using a CPU_ID that uniquely identifies the virtual processor that last wrote block 212. In this sense, the LAST_WRITER identifies the last exclusive owner of block 212.

The LAST_WRITE indicates an instruction counter value of the virtual processor at which point in the execution of the instruction stream (e.g., at which time) the virtual processor last wrote to memory in block 212. For example, suppose VCPU 116-1 is the virtual processor that last wrote to memory in block 212, and that VCPU 116-1 wrote block 212 when VCPU 116-1 was executing the $1,010^{th}$ instruction. In this example case, the LAST_WRITE specified the CPU_ID of VCPU 116-1 and LAST_WRITE is set to the value 1,010.

Still referring to FIG. 2B, block state data structure 230 also includes data values for a VIRTUAL_CPU, a LOCKED, a BUSY, a TYPE, a LAST_ACCESS, and a LAST_ACQUIRED for each virtual processor (e.g., VCPU 116-1 and VCPU 116-2). For example, in the example case of two virtual processors VCPU 116-1 and 116-2, block state data structure 230 includes VIRTUAL_CPU, LOCKED, BUSY, TYPE, LAST_ACCESS, and LAST_ACQUIRED values for VCPU 116-1 and LOCKED, BUSY, TYPE, LAST_ACCESS, and LAST_ACQUIRED values for VCPU 116-2.

The VIRTUAL_CPU identifies a virtual processor associated with LOCKED, BUSY, TYPE, LAST_ACCESS, and LAST_ACQUIRED values. In other words, the VIRTUAL_CPU identifies a virtual processor for which the LOCKED, BUSY, TYPE, LAST_ACCESS, and LAST_ACQUIRED values are being provided. The VIRTUAL_CPU may be specified using a CPU_ID that uniquely identifies the virtual processor.

The LOCKED value indicates that the virtual processor (i.e., the virtual processor identified by the VIRTUAL_CPU value) has either acquired or not acquired access to block 212. The type of access that is acquired (e.g., the permissions) is indicated by the STATE value (e.g., 'Shared' or 'Exclusive'). In an implementation, LOCKED may be a bit value that can be set either true ('1') or false ('0'). The LOCKED bit set to true (i.e., the LOCKED bit is set) indicates that the virtual processor has acquired access to block 212. The LOCKED bit set to false (i.e., the LOCKED bit is clear) indicates that the virtual processor has not acquired access to block 212. Note that, if the STATE is 'Shared', the LOCKED bit may be set true for one or more virtual processors. For example, in the case of VCPU 116-1 and VCPU 116-2, if the STATE is 'Shared', the LOCKED bit may be set true for VCPU 116-1, for VCPU 116-2, or for VCPU 116-1 and VCPU 116-2. If the STATE is 'Exclusive', the LOCKED bit may be set true for only one virtual processor at any point in time. For example, in the case of VCPU 116-1 and VCPU 116-2, if the STATE is 'Exclusive', the LOCKED bit may be set true for either VCPU 116-1 or VCPU 116-2 but not both VCPU 116-1 and VCPU 116-2 at any one point in time.

The BUSY value indicates that the virtual processor (i.e., the virtual processor identified by the VIRTUAL_CPU value) is either currently interacting with block state data structure 230 or not interacting with block state data structure 230. In an implementation, BUSY may be a bit value that may be set either true ('1') or false ('0'). The BUSY bit set to true indicates that the virtual processor is currently interacting with block state data structure 230. The BUSY bit set to false indicates that the virtual processor is currently not interacting with block state data structure 230. For example, in an implementation, when VCPU 116-2 starts the process of attempting to acquire block 212, VCPU 116-2 may set its BUSY bit to true in block state data structure 230 as an indication, for example, to other virtual processors (e.g., VCPU 116-1) that block state data structure 230 is currently being operated on. Note that the interaction is with the block state information (e.g., block state data structure 230) and not with the virtual memory block (e.g., block 212).

The TYPE indicates the type of access the virtual processor (i.e., the virtual processor identified by the VIRTUAL_CPU value) is attempting to acquire. In an implementation, the TYPE may be set to a value that indicates 'Shared' or 'Exclusive'. The TYPE 'Shared' indicates that the virtual processor is currently attempting to acquire shared access rights to block 212. The TYPE 'Exclusive' indicates that the virtual processor is currently attempting to acquire exclusive access rights to block 212.

The LAST_ACCESS indicates an instruction counter value of the virtual processor (i.e., the virtual processor identified by the VIRTUAL_CPU value) at which point in the execution of the instruction stream (e.g., at which time) the virtual processor last accessed memory in block 212. In other words, the LAST_ACCESS is the instruction counter value at which the virtual processor last successfully accessed (e.g., read or write) block 212. The LAST_ACQUIRED indicates a last instruction counter value at which point in the execution of the instruction stream (e.g., at which time) the virtual processor (i.e., the virtual processor identified by the VIRTUAL_CPU value) attempted to acquire access to block 212.

Figure 2C:
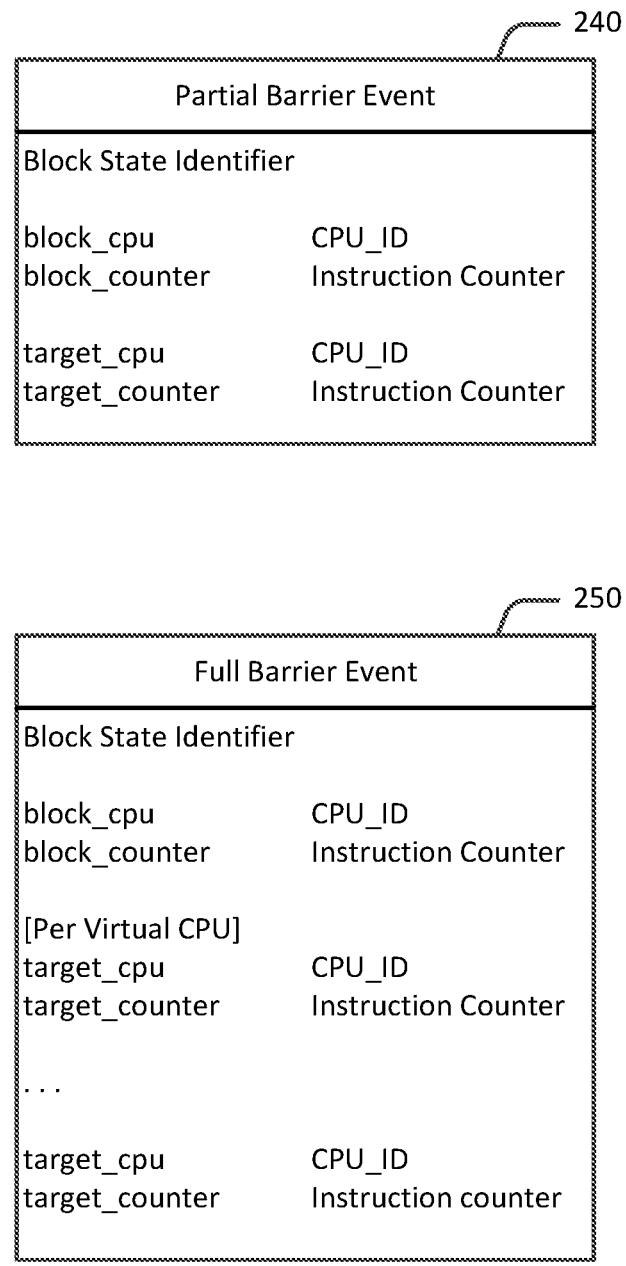
FIG. 2C illustrates an example partial barrier event data structure and an example full barrier event data structure, in accordance with an embodiment of the present disclosure.

FIG. 2C illustrates an example partial barrier event data structure 240 and an example full barrier event data structure 250, in accordance with an embodiment of the present disclosure. In an embodiment, a partial barrier event data structure may be generated to record a partial barrier event, and a full barrier event data structure may be generated to record a full barrier event. The generated partial barrier event data structure and/or full barrier event data structure include information to recreate the virtual processor state transitions in (associated with) acquiring a block of virtual memory. The partial barrier event data structure and full barrier event data structure may be generated during live execution and can then be utilized during replay to recreate the virtual processor state transitions (i.e., the virtual processor ordering) to make the virtual memory block acquisition deterministic.

As shown in the example of FIG. 2C, partial barrier data structure 240 includes data values for a Block State Identifier, a block_cpu, a block_counter, a target_cpu, and a target_counter. The Block State Identifier identifies a block state data structure (e.g., block state data structure 230) associated with the partial barrier event data structure (e.g., partial barrier event data structure 240). As such, the Block State Identifier indirectly identifies the virtual memory block against which a partial barrier event is being generated. The block_cpu identifies a virtual processor to block (i.e., a virtual processor that is being blocked). The block_cpu may be specified using a CPU_ID that uniquely identifies the virtual processor. The block_counter indicates an instruction counter value of the virtual processor (i.e., the virtual processor identified by the block_cpu value) at which (at which time) the virtual processor is to be blocked in the execution of the instruction stream. In other words, the block_counter value indicates a point at which the virtual processor is to be blocked during execution of its instruction stream. In this regard, in an implementation, the block_counter effectively indicates a point in the execution of the instruction stream at which the virtual processor (i.e., the virtual processor identified by the block_cpu value) is generating the partial barrier event.

The target_cpu identifies a virtual processor that the virtual processor identified by the block_cpu value is being synchronized against. The block_cpu may be specified using a CPU_ID that uniquely identifies the virtual processor. The target_counter indicates an instruction counter value of the virtual processor (i.e., the virtual processor identified by the target_cpu value) at which point the block_cpu becomes unblocked (i.e., at which time the block_cpu can resume executing instructions). During replay, the generated partial barrier event operates to effectively block a virtual processor (i.e., the virtual processor identified by the block_cpu value) at a specified point in the execution of its instruction stream (i.e., the instruction counter value indicated by the block_counter) until another virtual processor (i.e., the virtual processor identified by the target_cpu value) reaches or passes a specified point in the execution of its instruction stream (i.e., the instruction counter value indicated by the target_counter value). In this respect, the instruction counter values provide a concept of time for synchronizing or coordinating the block_cpu against the target_cpu.

Still referring to FIG. 2C, full barrier event data structure 250 includes data values for a Block State Identifier, a block_cpu, a block_counter, and, for each virtual processor (e.g., VCPU 116-1 and VCPU 116-2), a target_cpu and a target_counter. The Block State Identifier identifies a block state data structure (e.g., block state data structure 230) associated with the full barrier event data structure (e.g., full barrier event data structure 250). As such, the Block State Identifier indirectly identifies the virtual memory block against which a full barrier event is being generated. The block_cpu identifies a virtual processor to block (i.e., the virtual processor that is being blocked). The block_cpu may be specified using a CPU_ID that uniquely identifies the virtual processor. The block_counter indicates an instruction counter value of the virtual processor (i.e., the virtual processor identified by the block_cpu value) at which (at which time) the virtual processor is to be blocked in the execution of the instruction stream. In other words, the block_counter value indicates a point at which the virtual processor is to be blocked during execution of its instruction stream. In this regard, in an implementation, the block_counter effectively indicates the point in the execution of the instruction stream at which the virtual processor (i.e., the virtual processor identified by the block_cpu value) is generating the full barrier event.

Each target_cpu identifies a virtual processor that the virtual processor identified by the block_cpu value is being synchronized against. The target_cpu may be specified using a CPU_ID that uniquely identifies the virtual processor. The target_counter indicates an instruction counter value of the virtual processor (i.e., the virtual processor identified by the target_cpu value associated with the target_counter) at which point the blocked_cpu becomes unblocked with respect to that particular virtual processor (i.e., the virtual processor identified by the target_cpu value). Note that since there may be multiple target_cpus, the block_cpu may need to become unblocked with respect to multiple virtual processors before resuming execution of instructions. During replay, the generated full barrier event operates to effectively block a virtual processor (i.e., the virtual processor identified by the block_cpu value) at a specified point in the execution of its instruction stream (i.e., the instruction counter value indicated by the block_counter value) until the other virtual processors (i.e., the virtual processors identified by the target_cpu values) reaches or passes a specified point in the execution of their respective instruction stream (i.e., respective instruction counter value indicated by the target_counter value). In this respect, the instruction counter values provide a concept of time for synchronizing or coordinating the block_cpu against the other target_cpus.

In an example use case, and in some embodiments, the ordering of memory writes with respect to memory reads and other memory writes within the same virtual memory block are recorded. More specifically, in an implementation, a virtual memory block is initially set to an available state. To perform a read memory access (e.g., memory read instruction) in the virtual memory block, a virtual processor running in a guest VM first acquires the virtual memory block in a shared state (e.g., STATE 'Shared'). In acquiring the memory block in a shared state, the virtual processor may record a partial barrier event between it (the virtual processor recording the partial barrier event) and a virtual processor in the guest VM that last wrote the virtual memory block at an instruction counter value when the write to the virtual memory block occurred. Note that the instruction counter value in this instance is the instruction counter value of the virtual processor that last wrote the virtual memory block. To perform a write memory access (e.g., memory write instruction) in the virtual memory block, a virtual processor running in a guest VM first acquires the virtual memory block exclusively. In acquiring the virtual memory block in an exclusive state, the virtual processor may record a full barrier event between it (the virtual processor recording the full barrier event) and every other virtual processor in the guest VM at the time (i.e., instruction counter value) the other virtual processors last accessed the virtual memory block. In this regard, the recorded barrier events (partial barrier event and full barrier events) record the block state transitions and allow for recreating the state transitions (the ordering) to make the memory acquisition deterministic during replay.

Figure 2D:
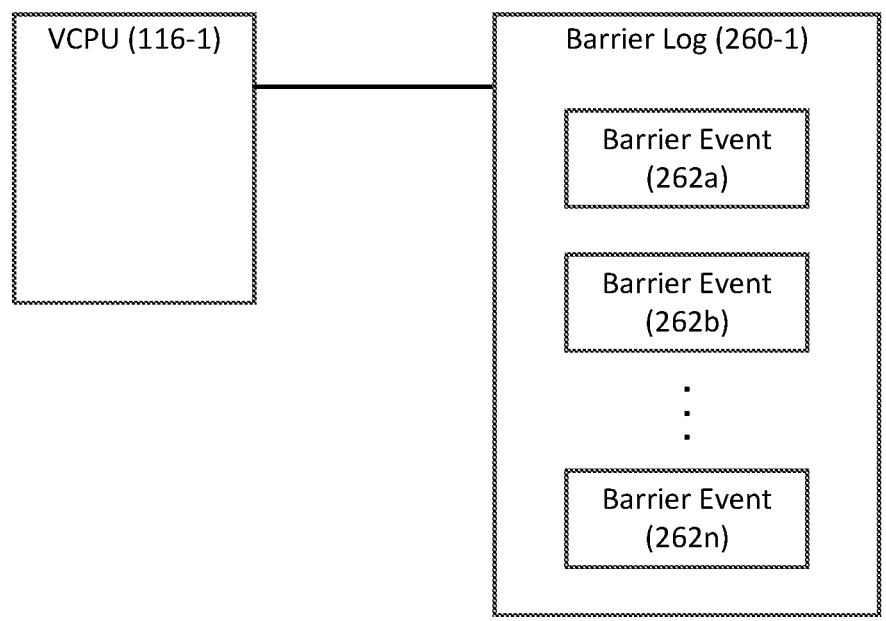
FIG. 2D is a diagram illustrating virtual processors and associated barrier logs, in accordance with an embodiment of the present disclosure.
Figure 2D:
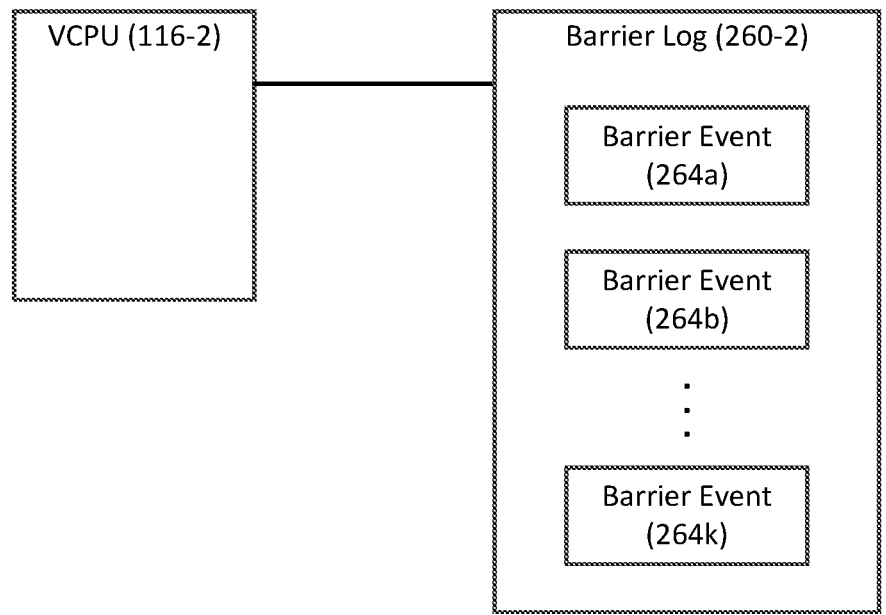

FIG. 2D is a diagram illustrating virtual processors and associated barrier logs, in accordance with an embodiment of the present disclosure. In an implementation, the virtual processors (e.g., VCPU 116-1 and VCPU 116-2) running in a guest VM (e.g., guest VM 110) may maintain respective barrier logs. A barrier log associated with a virtual processor may include a list of the barrier events (e.g., partial barrier event data structures and full barrier event data structure) generated by or otherwise associated with the virtual processor. In this manner, a barrier log associated with a virtual processor may allow the virtual processor to more efficiently utilize the barrier events during replay. As shown in the example of FIG. 2D, VCPU 116-1 may maintain a barrier log 260-1, which includes barrier events 262a-262n, and VCPU 116-2 may maintain a barrier log 260-2, which includes barrier events 264a-264k. Each barrier event 262a-262n may be or otherwise identify either a partial barrier event data structure (e.g., partial barrier event data structure 240) or a full barrier event data structure (e.g., full barrier event data structure 250) generated by or otherwise associated with VCPU 116-1 during live execution. Similarly, each barrier event 264a-264k may be or otherwise identify either a partial barrier event data structure (e.g., partial barrier event data structure 240) or a full barrier event data structure (e.g., full barrier event data structure 250) generated by or otherwise associated with VCPU 116-2 during live execution. In some such implementations, the barrier events in the barrier log may be maintained in a sequence, such as, according to the order the barrier events were generated. Note that the numbers of barrier events shown in FIG. 2D is for purposes of clarity, and it will be appreciated that a barrier log (e.g., barrier log 260-1 or barrier log 260-2) may include a different number of barrier events than that shown in FIG. 2D.

Note that the system may also produce non-deterministic event log entries for non-deterministic events that are typical for accomplishing single-core deterministic replay. The concept of single-core deterministic replay is well understood in the fields of virtualization and replay execution and will not be discussed in detail here. However, for purposes of this discussion, it is sufficient to understand that the system may maintain a single non-deterministic event log which contains barrier event entries as variously described herein along with other non-deterministic event entries generally known to accomplish single-core deterministic replay. Note also that the system may maintain multiple logs which store non-deterministic event entries by type (e.g., the "barrier log"

described herein contains barrier events related to nondeterministic memory access).

Figure 2E:
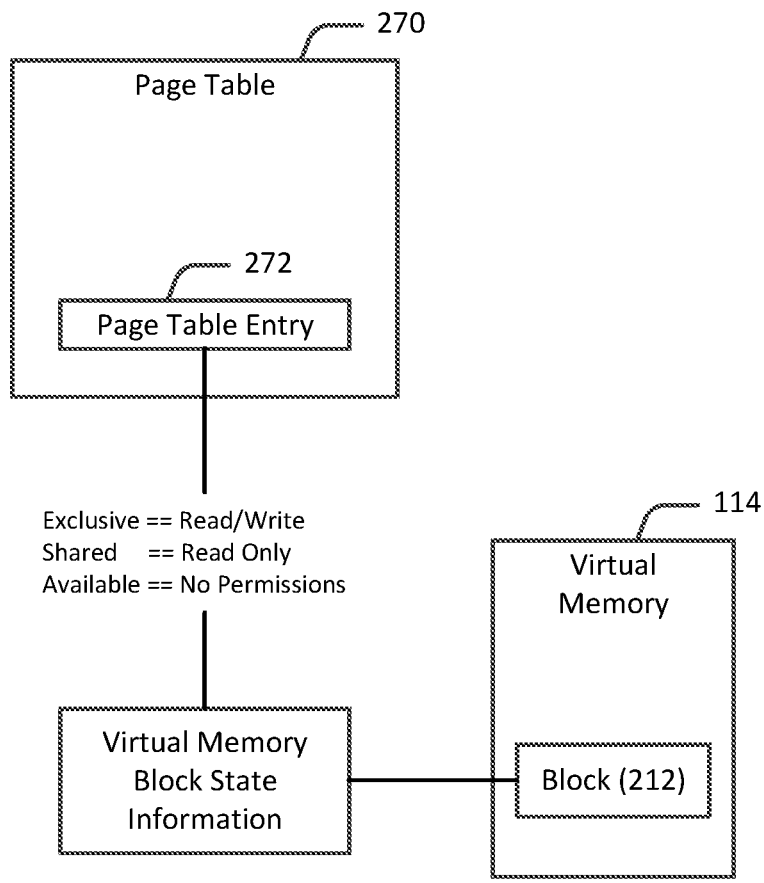
FIG. 2E is a block diagram illustrating an example mapping of virtual memory block state information to a page table, in accordance with an embodiment of the present disclosure.

FIG. 2E is a block diagram illustrating an example mapping of virtual memory block state information to a page table 270, in accordance with an embodiment of the present disclosure. In an embodiment, such as in the emulation execution environment, page table 270 may be an emulated page table that may be utilized by an emulator implementation of virtualization system 100. In any such cases, page table 270 may be implemented as a data structure that may be used by a virtual memory system (e.g., virtualization system 100) to store mappings between guest virtual addresses and machine physical addresses. The guest virtual addresses may be memory addresses used by the memory accessing program (e.g., guest VM 110) and the machine physical addresses may be memory addresses used by the hardware of the host system (e.g., host system hardware 102). In this respect, page table 270 is a mechanism that constrains the ability of a guest VM to access the host system memory (e.g., host memory 104).

In some embodiments, page table 270 may be configured to map information from the block state data structures associated with the virtual memory blocks to respective page table entries in page table 270. As shown in the example of FIG. 2D, page table 270 may include a page table entry 272 that maps the state information of block 212 in virtual memory 114. In particular, page table entry 272 may include a mapping of the STATE value in block state data structure 230 associated with block 212. For example, in an implementation, the STATE 'Exclusive' may map to a 'Read/Write' permission, the STATE 'Shared' may map to a 'Read Only' permission, and the STATE 'Available' may map to 'No Permissions'. Page table 270 may include similar page table entries for the other virtual memory blocks, such as, for example, blocks 214, 216, 218. Note that the mapping of the permissions illustrated in FIG. 2E is for purposes of clarity, and it will be appreciated that the mappings may include different and/or additional permissions than that shown in FIG. 2E.

In an example operation of a page table, when a guest VM attempts to access memory (e.g., read memory access or write memory access) in a virtual memory block, the information from the page table may be used to determine whether the guest VM has the requisite permissions to perform the attempted memory access. A determination that the guest VM has the requisite permissions results in the guest VM being allowed to perform the memory access. Conversely, a determination that the guest VM does not have the requisite permissions results in a fault condition, which may cause the guest VM to exit and obtain the necessary permissions (i.e., requisite access of the virtual memory block) to perform the attempted memory access.

As will be described in more detail below in conjunction with FIGS. 3-6, block state data structures, partial barrier event data structures, full barrier event data structures, barrier logs, and page tables may be generated and/or used by a multicore VM instance to produce and capture the information to successfully replay nondeterministic multicore execution deterministically. The multicore VM instance may be running in either an emulation execution environment or a hardware acceleration execution environment. Note that while memory access is used as an example of a nondeterministic event throughout this description for purposes of explanation, it will be appreciated in light of this disclosure that the techniques introduced here can be similarly applied to other nondeterministic multicore execution, such as, for example, access to and/or interaction with external or peripheral devices (e.g., a shared clock, hard drive, solid state drive, network device, and the like) where ordered access may be of concern.

Figure 3:
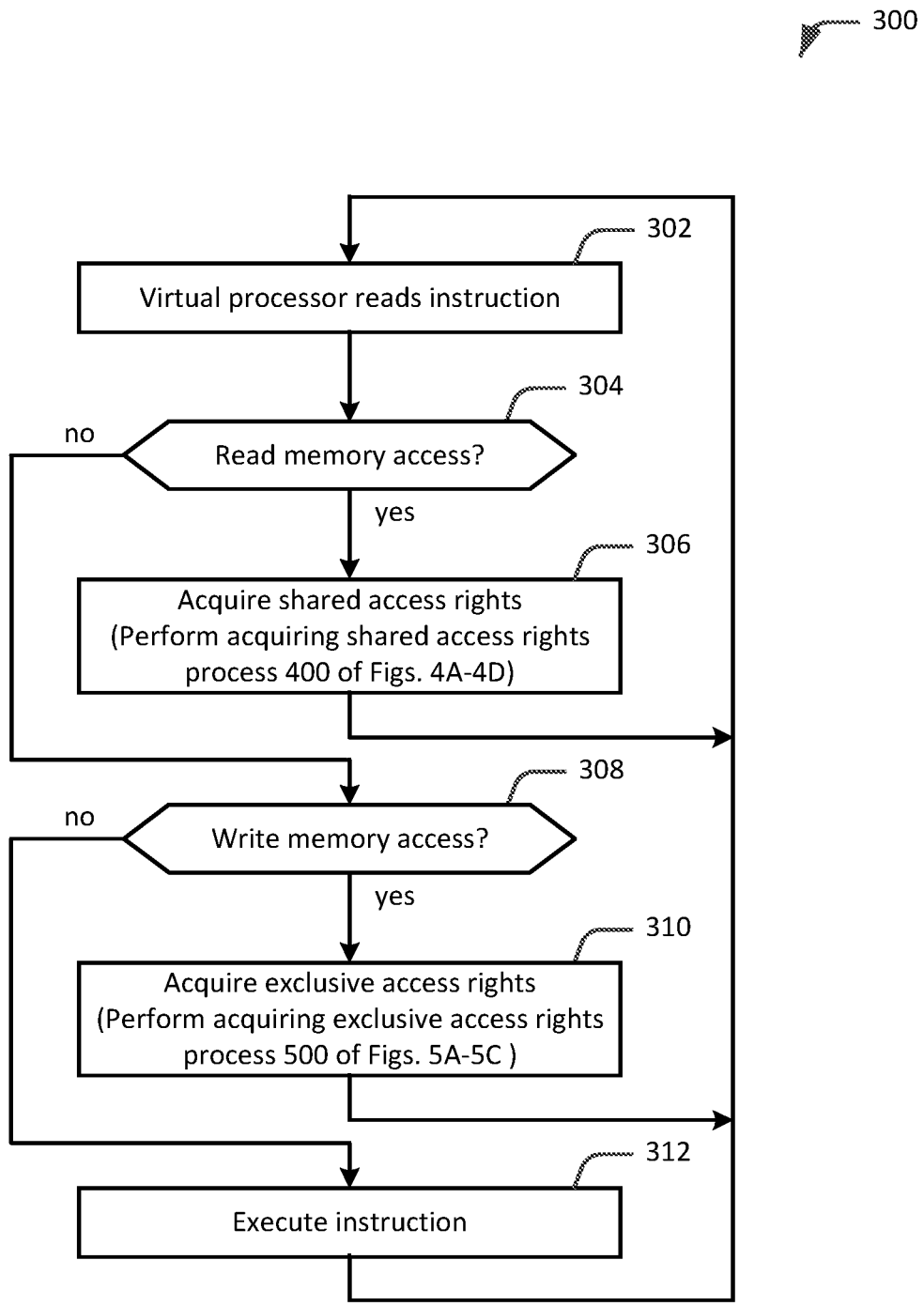
FIG. 3 is a flow diagram illustrating an example process for interposing on memory accesses during live execution, in accordance with an embodiment of the present disclosure.
Figure 4A:
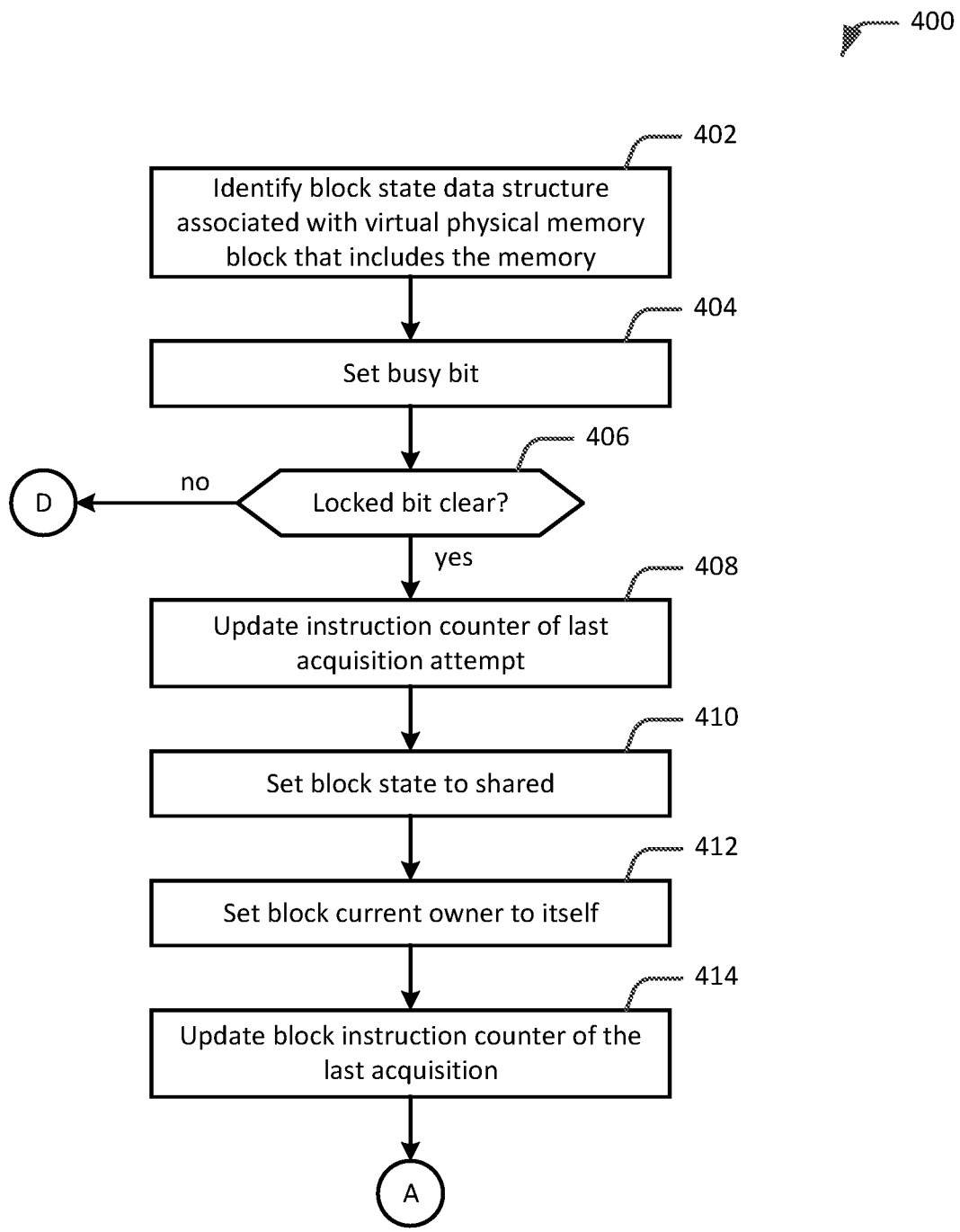
FIGS. 4A-D are flow diagrams of an example process for interposing on a read memory access, in accordance with an embodiment of the present disclosure.
Figure 4B:
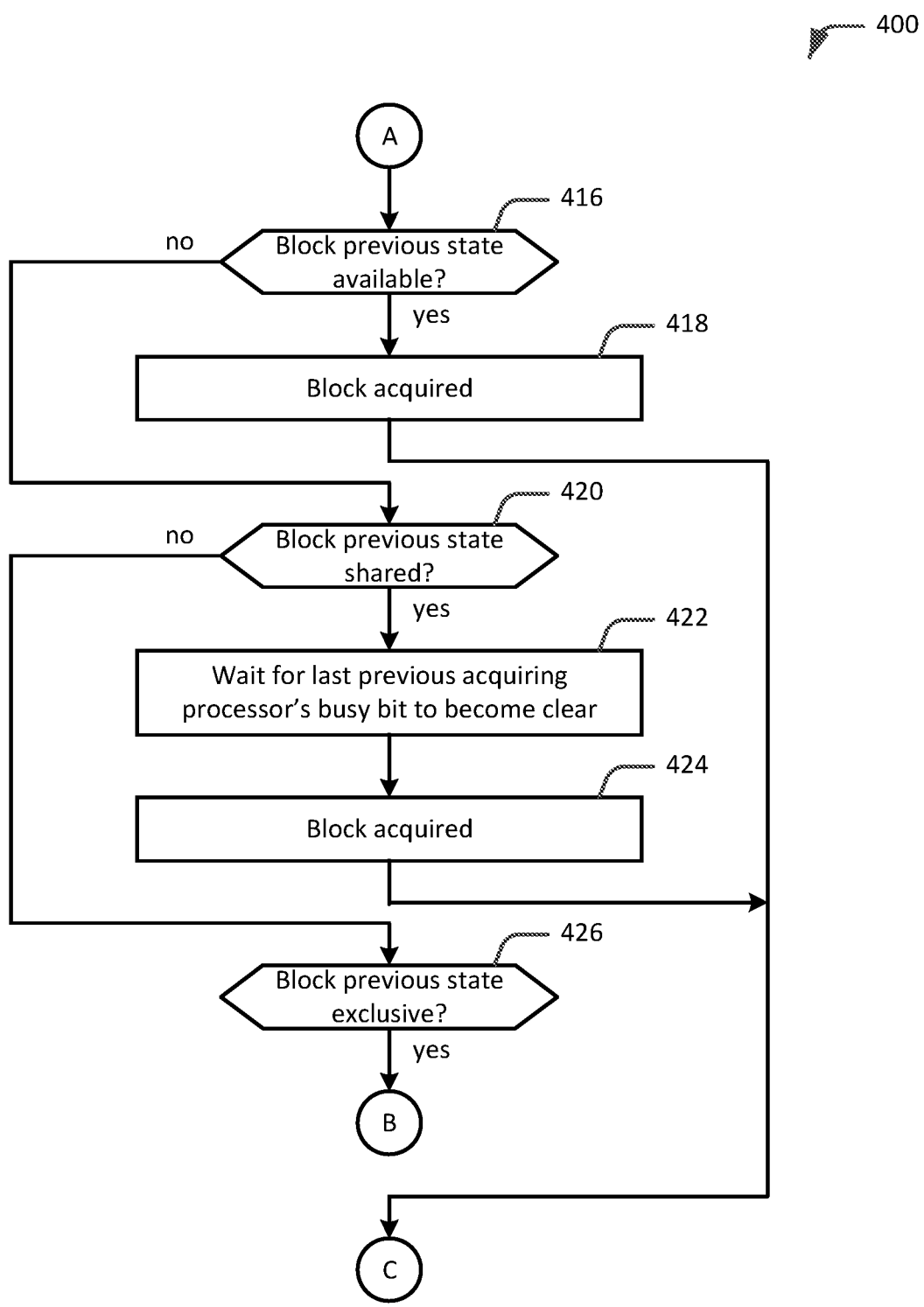
Figure 4C:
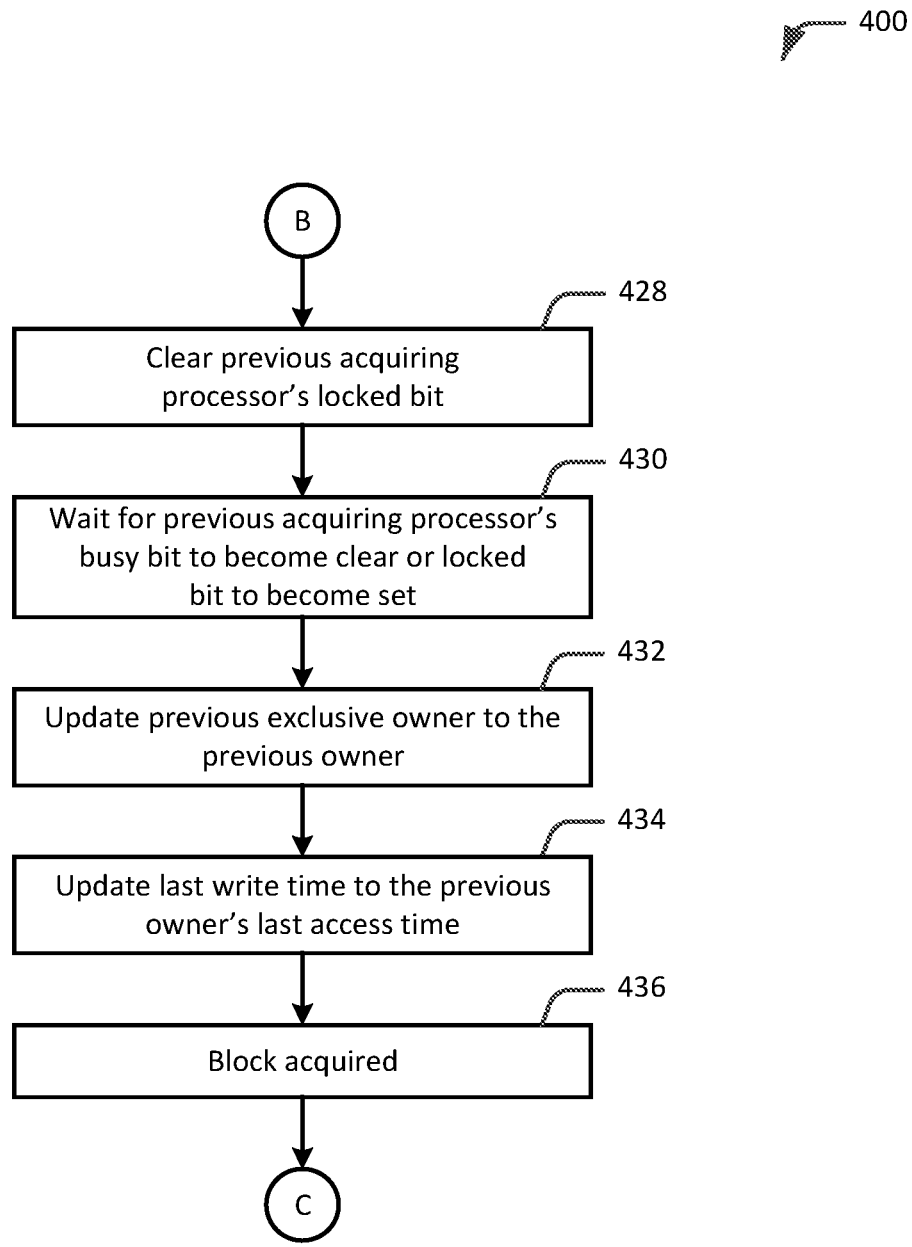
Figure 4D:
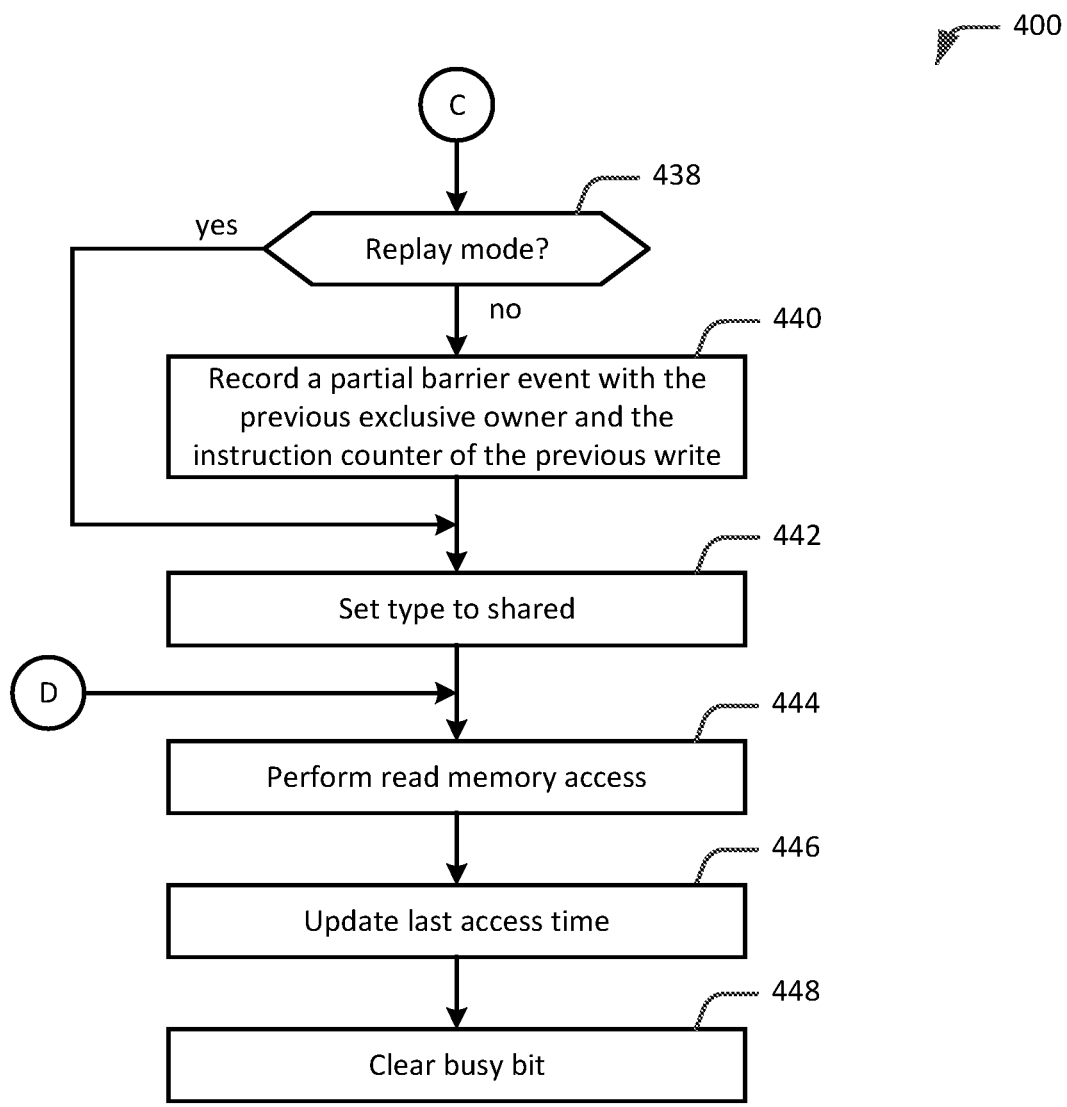

More specifically, FIGS. 3-5 are flow diagrams illustrating an example processing by a virtual processor of a guest VM to capture information during live guest VM execution that allows for deterministically recreating the memory accesses during guest VM replay. FIG. 6 is a flow diagram illustrating an example processing by a virtual processor of a guest VM to deterministically recreate memory accesses during replay of the guest VM.

Referring now to FIG. 3, an example process 300 for interposing on memory accesses during live execution is shown that may be carried out by a multicore virtual machine (VM) instance (e.g., VCPU 116 of guest VM 110 shown and described above in conjunction with FIG. 1). For example, as shown in FIG. 1, guest VM 110 may have provisioned 2 virtual processors, VCPU 116-1 and VCPU 116-2, and VCPU 116-1 and VCPU 116-2 may be executing respective instruction streams within the running instance of guest VM 110. As such, in this context, VCPU 116 may refer to either VCPU 116-1 or VCPU 116-2. Furthermore, when guest VM 110 is instantiated, the page table entries (e.g., page table entries 272 in page table 270) and virtual memory block state information (e.g., block state data structures 230) may be initialized to a known state. For example, block state data structures 230 may be initialized to indicate that the associated virtual memory blocks (e.g., blocks 212-218 of virtual memory 114) are available.

With reference to process 300, at 302, VCPU 116 may read an instruction to be executed. The instruction may be from an instruction stream being executed by VCPU 116. At 304, a check may be made to determine whether the instruction is a read memory access instruction. If the instruction is a read memory access instruction, then at 306, VCPU 116 may interpose on the read memory access. In brief, VCPU 116 can interpose on the read memory access to capture the information to successfully replay the nondeterministic read memory access instruction execution deterministically. Interposing on read memory access is further described below at least in conjunction with FIGS. 4A-4D.

Otherwise, if the instruction being executed is not a read memory access, then at 308, a check may be made to determine whether the instruction is a write memory access instruction. If the instruction is a write memory access instruction, then at 310, VCPU 116 may interpose on the write memory access. In brief, VCPU 116 can interpose on the write memory access to capture the information to successfully replay the nondeterministic write memory access instruction execution deterministically. Interposing on write memory access is further described below at least in conjunction with FIGS. 5A-5C. Note that an instruction execution (e.g., read memory access instruction execution or a write memory access instruction) may be embodied by either the retirement of an entire instruction, or the partial execution of an instruction.

Otherwise, if the instruction being executed is not a write memory access, then at 312, VCPU 116 executes the instruction that was read at 302 and returns to 302 to read a next instruction (e.g., a next instruction in its instruction stream). Note that in this instance, the instruction read at 302 is an instruction other than a read memory access instruction or a write memory access instruction. However, the instruction may be another type of nondeterministic multicore instruction, in which case VCPU 116 may capture the required information to successfully replay the nondeterministic multicore instruction execution deterministically in a manner similar to those described herein for memory access.

FIGS. 4A-D are flow diagrams of an example process 400 for interposing on a read memory access, in accordance with an embodiment of the present disclosure. In particular, the flow diagrams illustrate interposing on a virtual processor attempting to perform a read memory access. In brief, in an implementation, a virtual processor (e.g., VCPU 116) may attempt a read memory access, in which case a memory management component (e.g., virtual memory manager 108) may enforce access rights. In the case of a violation (e.g., VCPU 116 does not have the proper access rights), VCPU 116 may be paused, and the virtualization system (e.g., virtualization system 100) may interpose to complete the read memory access (e.g., acquire the page, record barrier events, etc.).

With reference to process 400, at operation 402, VCPU 116 may identify a particular block state data structure (e.g., block state data structure 230) that is associated with a virtual memory block (e.g., block 212, 214, 216, or 218) that includes the memory that is being accessed by the read memory access instruction. The identified block state data structure 230 includes information regarding the state of the virtual memory block that includes the memory that is to be accessed. The identified block state data structure 230 also includes information regarding the virtual processors (e.g., VCPU 116-1 and VCPU 116-2) with respect to each virtual processor's interaction with the virtual memory block that includes the memory that is to be accessed. In an implementation, VCPU 116 may maintain a copy of the information included in the identified block state data structure 230, for example, prior to updating any information in the identified block state data structure 230. For example, VCPU 116 may copy the information from block state data structure 230 to a suitable storage medium, such as a memory 706 further described below in conjunction with FIG. 7.

At operation 404, VCPU 116 may set its BUSY bit in the identified block state data structure 230 to indicate that VCPU 116 is interacting with that particular block state data structure 230. In an implementation, the BUSY bit being set may also serve as an indication that VCPU 116 has not completed or otherwise finished interacting with the virtual memory block associated with the identified block state data structure 230. The virtual memory block associated with the identified block state data structure 230 is also referred to herein in the description of process 400 as the "associated virtual memory block" for brevity.

At operation 406, VCPU 116 may check its LOCKED bit in the identified block state data structure 230 to determine whether it has acquired access to the associated virtual memory block. This LOCKED bit being set indicates that VCPU 116 currently has access (e.g., 'Shared' or 'Exclusive') to the associated virtual memory block. In other words, the LOCKED bit being set is an indication that VCPU 116 has the necessary permissions to access the associated virtual memory block to perform the read memory access. Conversely, this LOCKED bit being clear (i.e., not set) is an indication that VCPU 116 needs to acquire access to the associated virtual memory block to perform the read memory access. If VCPU 116 determines that its LOCKED bit in the identified block state data structure 230 is set, VCPU 116 may determine (i.e., conclude) that it has the necessary access rights and proceed with executing the read memory access instruction, at operation 444.

Otherwise, if VCPU 116 determines that its LOCKED bit in the identified block state data structure 230 is clear, then at operation 408, VCPU 116 may update its LAST_ACQUIRED value in the identified block state data structure 230 to its current instruction counter value. The current instruction counter value is the instruction counter value of or otherwise associated with the read memory access instruction that is being executed by VCPU 116. For example, if the read memory access instruction is the 200$^{th}$ instruction being executed by VCPU 116, then VCPU 116 updates its LAST_ACQUIRED value in the identified block state data structure 230 to 200. VCPU 116 may update its LAST_ACQUIRED value to indicate the instruction counter value (e.g., time) at which VCPU 116 is attempting to acquire access to the associated virtual memory.

At operation 410, VCPU 116 may set the STATE value in the identified block state data structure 230 to 'Shared'. VCPU 116 may set the STATE to 'Shared' as an indication that an attempt is being made to acquire shared access rights to the associated virtual memory block.

At operation 412, VCPU 116 may set the OWNER value in the identified block state data structure 230 to itself (e.g., a specific CPU_ID that identifies VCPU 116). VCPU 116 may set the OWNER to itself as an indication that VCPU 116 is attempting to (wants to) acquire shared access rights to the associated virtual memory block.

At operation 414, VCPU 116 may update the ACQUIRED_CTR value in the identified block state data structure 230 to its current instruction counter value. The current instruction counter value is the instruction counter value of or otherwise associated with the read memory access instruction that is being executed by VCPU 116. VCPU 116 may update the ACQUIRED_CTR value as an indication that VCPU 116 was executing an instruction associated with the instruction counter value when VCPU 116 acquired shared access rights to the associated virtual memory block.

At operation 416, VCPU 116 may check to determine whether the previous state of the associated virtual memory block was 'Available'. The previous state of the associated virtual memory block may be determined from the previous STATE value in the identified block state data structure 230 (e.g., the STATE value prior to VCPU 116 update of the STATE value at operation 410). The STATE 'Available' indicates that no access rights or permissions are attached to the associated virtual memory block, the STATE 'Shared' indicates that shared access rights or permissions are attached to the associated virtual memory block, and the STATE 'Exclusive' indicates that exclusive access rights or permissions are attached to the associated virtual memory block.

If VCPU 116 determines that the previous state of the associated virtual memory block was 'Available' (i.e., previous STATE value in the identified block state data structure 230 was 'Available'), then at operation 418, VCPU 116 may determine that it has acquired shared access rights to the associated virtual memory block. VCPU 116 may set its LOCKED bit (e.g., the LOCKED bit associated with VCPU 116 in the identified block state data structure 230) to indicate that it has acquired access rights to the associated virtual memory block. VCPU 116 may then proceed with executing the read memory access instruction, at operation 438.

Otherwise, if VCPU 116 determines that the previous state of the associated virtual memory block was not 'Available', then at operation 420, VCPU 116 may check to determine whether the previous state of the associated virtual memory block was 'Shared'. If VCPU 116 determines that the previous state of the associated virtual memory block was 'Shared', then at operation 422, VCPU 116 may wait for the last previous acquiring virtual processor's BUSY bit to become clear. Note that in the 'Shared' state, one or more virtual processors may have shared access rights to the associated virtual memory block. A previous acquiring virtual processor is a virtual processor that has acquired shared access rights to the associated virtual memory block prior to the current attempt by VCPU 116 to acquire shared access rights. Of these, the last previous acquiring virtual processor is the virtual processor that last interacted with or otherwise accessed the associated virtual memory block. The last previous acquiring virtual processor (i.e., the previous acquiring virtual processor that last interacted with the associated virtual memory block) may be identified from the previous OWNER value in the identified block state data structure 230 (e.g., the OWNER value prior to VCPU 116 update of the OWNER value at operation 412). VCPU 116 may wait for the last previous acquiring virtual processor's BUSY bit (e.g., the BUSY bit associated with the last previous acquiring virtual processor in the identified block state data structure 230) to become clear, which is an indication that the last previous acquiring virtual processor has completed or otherwise finished interacting with the associated virtual memory block. In an implementation, VCPU 116 may cease or otherwise stop executing instructions (e.g., block itself) while waiting for the last previous acquiring virtual processor's BUSY bit to become clear.

Once the last previous acquiring virtual processor's BUSY bit becomes clear, at operation 424, VCPU 116 may determine that it has acquired shared access rights to the associated virtual memory block. VCPU 116 may set its LOCKED bit (e.g., the LOCKED bit associated with VCPU 116 in the identified block state data structure 230) to indicate that it has acquired access rights to the associated virtual memory block. VCPU 116 may then proceed with executing the read memory access instruction, at operation 438.

Otherwise, if VCPU 116 determines that the previous state of the associated virtual memory block was not 'Available' or 'Shared', then at operation 426, VCPU 116 may check to determine whether the previous state of the associated virtual memory block was 'Exclusive'. If VCPU 116 determines that the previous state of the associated virtual memory block was 'Exclusive', then at operation 428, VCPU 116 may clear the previous acquiring processor's LOCKED bit. Note that in the 'Exclusive' state, the previous acquiring processor is the only virtual processor that may have exclusive access rights to the associated virtual memory block. The previous acquiring virtual processor may be identified from the previous OWNER value in the identified block state data structure 230 (e.g., the OWNER value prior to VCPU 116 update of the OWNER value at operation 412). VCPU 116 may clear the previous acquiring processor's LOCKED bit (e.g., the LOCKED bit associated with the previous acquiring processor in the identified block state data structure 230) as an indication that the previous acquiring processor no longer has acquired exclusive access rights to the associated virtual memory block.

At operation 430, VCPU 116 may wait for the previous acquiring virtual processor's BUSY bit to become clear or the previous acquiring processor's LOCKED bit to become set. The previous acquiring virtual processor's BUSY bit (e.g., the BUSY bit associated with the previous acquiring virtual processor in the identified block state data structure 230) becoming clear indicates that the previous acquiring virtual processor has completed or otherwise finished interacting with the associated virtual memory block. The previous acquiring virtual processor's LOCKED bit (e.g., the LOCKED bit associated with the previous acquiring virtual processor in the identified block state data structure 230) becoming set indicates that the previous acquiring virtual processor has again acquired access rights to the associated virtual memory block. The LOCKED bit being set suggests that an acquisition occurred while we were waiting, and further suggests that the BUSY bit will shortly become cleared as the acquisition has completed, and therefore VCPU 116 can proceed. This condition holds because, at preceding operation 428, VCPU 116 clears the previous acquiring processor's LOCKED bit. So, if the LOCKED bit has been cleared, and the LOCKED bit becomes subsequently locked (i.e., relocked), then VCPU 116 knows the precise state of the previous acquiring virtual processor and can proceed.

Once the previous acquiring virtual processor's BUSY bit becomes clear or the previous acquiring processor's LOCKED bit becomes set, at operation 432, VCPU 116 may update the previous exclusive owner information by updating the LAST_WRITER value in the identified block state data structure 230. As previously described, the LAST_WRITER value in a block state data structure identifies a virtual processor that last wrote to a virtual memory block associated with the block state data structure. Since the previous state of the associated virtual memory block was 'Exclusive', the previous exclusive owner of the associated virtual memory block is the last virtual processor that acquired exclusive access rights to the associated virtual memory block. Furthermore, the last virtual processor that acquired exclusive access rights to the associated virtual memory block may be identified from the previous OWNER value in the identified block state data structure 230 (e.g., the OWNER value prior to VCPU 116 update of the OWNER value at operation 412).

At operation 434, VCPU 116 may update the last write time to the previous owner's last access time. The previous owner is the last virtual processor that acquired exclusive access rights to the associated virtual memory block. VCPU 116 may update the last write time by updating the LAST_WRITE value in the identified block state data structure 230 to the instruction counter value corresponding to an instruction that the previous owner was executing when the previous owner last wrote (e.g., last write memory access instruction executed by the previous owner) to the associated virtual memory block.

At operation 436, VCPU 116 may determine that it has acquired shared access rights to the associated virtual memory block. VCPU 116 may set its LOCKED bit (e.g., the LOCKED bit associated with VCPU 116 in the identified block state data structure 230) to indicate that it has acquired access rights to the associated virtual memory block. VCPU 116 may then proceed with executing the read memory access instruction, at operation 438.

At operation 438, VCPU 116 may optionally check to determine whether VCPU 116 is executing in replay mode. More specifically, the check is to determine whether VCPU 116 is executing instructions during replay of guest VM 110. In replay mode, VCPU 116 does not need to record the virtual processor ordering constraints associated with acquiring the associated virtual memory block (e.g., the identified block state data structure 230 transitions). However, in non-replay mode (i.e., live mode), VCPU 116 records the respective states of the virtual processors (e.g., VCPU 116-1 and VCPU 116-2) when the acquiring virtual processor (e.g., VCPU 116) acquired shared access rights to the associated virtual memory block. In other words, VCPU 116 records the virtual processor ordering constraints associated with acquiring the associated virtual memory block for use during replay.

If VCPU 116 determines that it is executing in non-replay mode, then at operation 440, VCPU 116 may generate a partial barrier event data structure (e.g. partial barrier event data structure 240) to record a partial barrier event. In partial barrier event data structure 240, VCPU 116 may set the Block State Identifier value to identify the identified block state data structure 230, the block_cpu value to itself (e.g., a specific CPU_ID that identifies VCPU 116), and the block_counter value to its current instruction counter value. The current instruction counter value is the instruction counter value of the read memory access instruction that is being executed by VCPU 116. If the previous state of the associated virtual memory block was 'Shared', VCPU 116 may set the target_cpu value to identify last previous acquiring virtual processor (i.e., the previous acquiring virtual processor that last interacted with the associated virtual memory block) and set the target_counter value to zero (0) in partial barrier event data structure 240. Note that the target_counter may be set to zero (0) since the previous state of the associated virtual memory block was 'Shared', in which case a write access of the associated virtual memory block did not occur. If the previous state of the associated virtual memory block was 'Exclusive', VCPU 116 may set the target_cpu value to identify the previous exclusive owner of the associated virtual memory block (e.g., the virtual processor indicated by the LAST_WRITER value in the identified block state data structure 230) and set the target_counter value to the previous exclusive owner's last write memory access to the associated virtual memory block (e.g., the instruction counter value indicated by the LAST_WRITE value in the identified block state data structure 230) in partial barrier event data structure 240. In an implementation, VCPU 116 may include the generated partial barrier event data structure 240 in its barrier log (e.g., barrier log 260).

At operation 442, VCPU 116 may set its TYPE value in the identified block state data structure 230 to 'Shared'. In this instance, since its LOCKED bit is set, setting the TYPE to 'Shared' is an indication that VCPU 116 has acquired shared access rights to the associated virtual memory block.

At operation 444, VCPU 116 may execute the read memory access instruction. For example, as part of executing the read memory access instruction, VCPU 116 may attempt to map the associated virtual memory block into its virtual page table (e.g., virtual memory page table 202). Once the appropriate memory page is successfully mapped into its virtual memory page table 202, VCPU 116 can proceed with executing the read memory access instruction.

At operation 446, VCPU 116 may update its LAST_ACCESS value in the identified block state data structure 230 to its current instruction counter value. The current instruction counter value is the instruction counter value of or otherwise associated with the read memory access instruction that is being executed by VCPU 116. VCPU 116 may update its LAST_ACCESS value to indicate the instruction counter value (e.g., time) at which VCPU 116 last successfully accessed (e.g., read) the associated virtual memory block.

At operation 448, VCPU 116 may clear its BUSY bit in the identified block state data structure 230 to indicate that VCPU 116 is no longer interacting with the identified block state data structure 230. In an implementation, the BUSY bit being cleared may also serve as an indication that VCPU 116 has completed or otherwise finished interacting with the virtual memory block associated with the identified block state data structure 230.

Figure 5A:
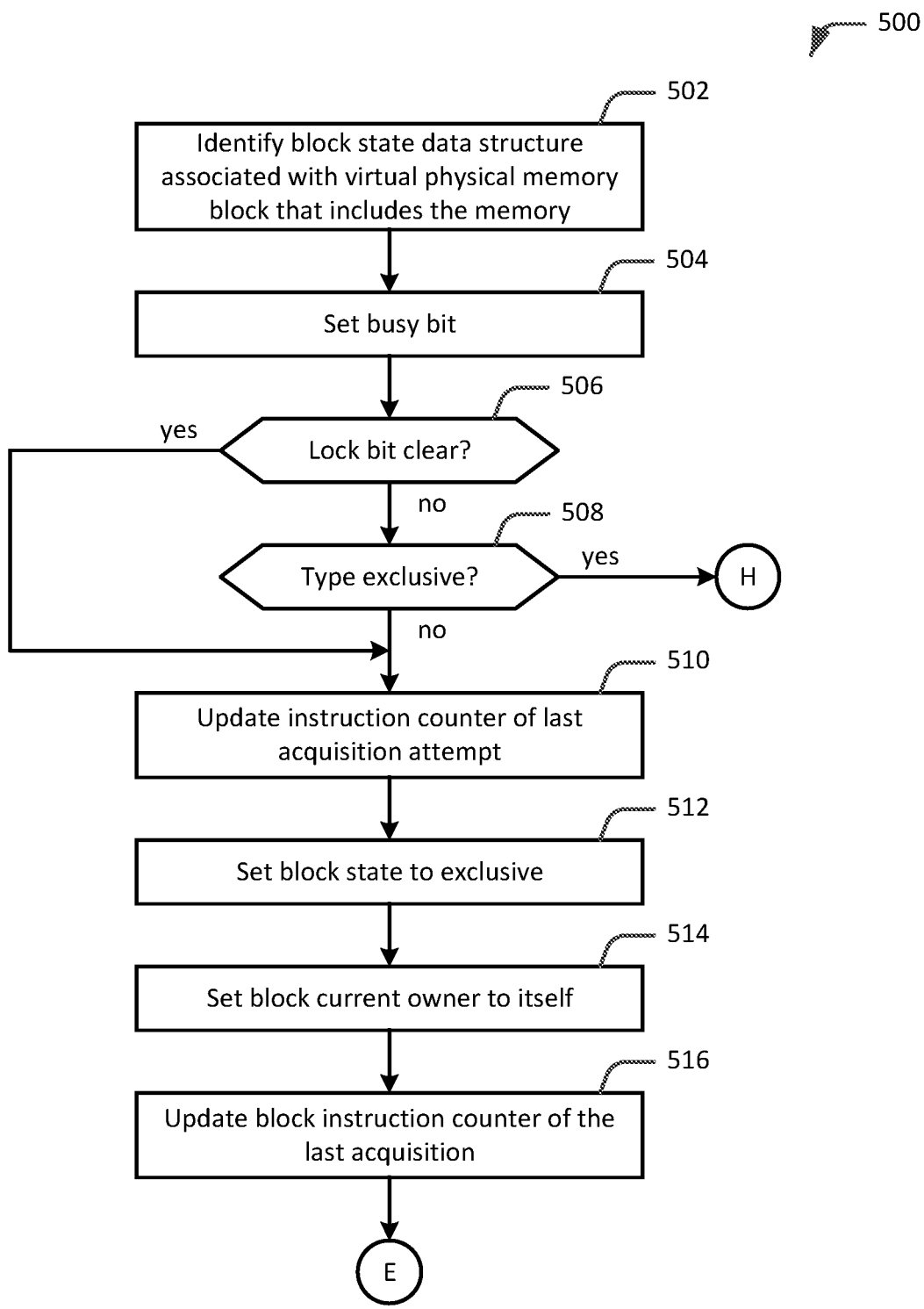
FIGS. 5A-C are flow diagrams of an example process for interposing on a write memory access, in accordance with an embodiment of the present disclosure.
Figure 5B:
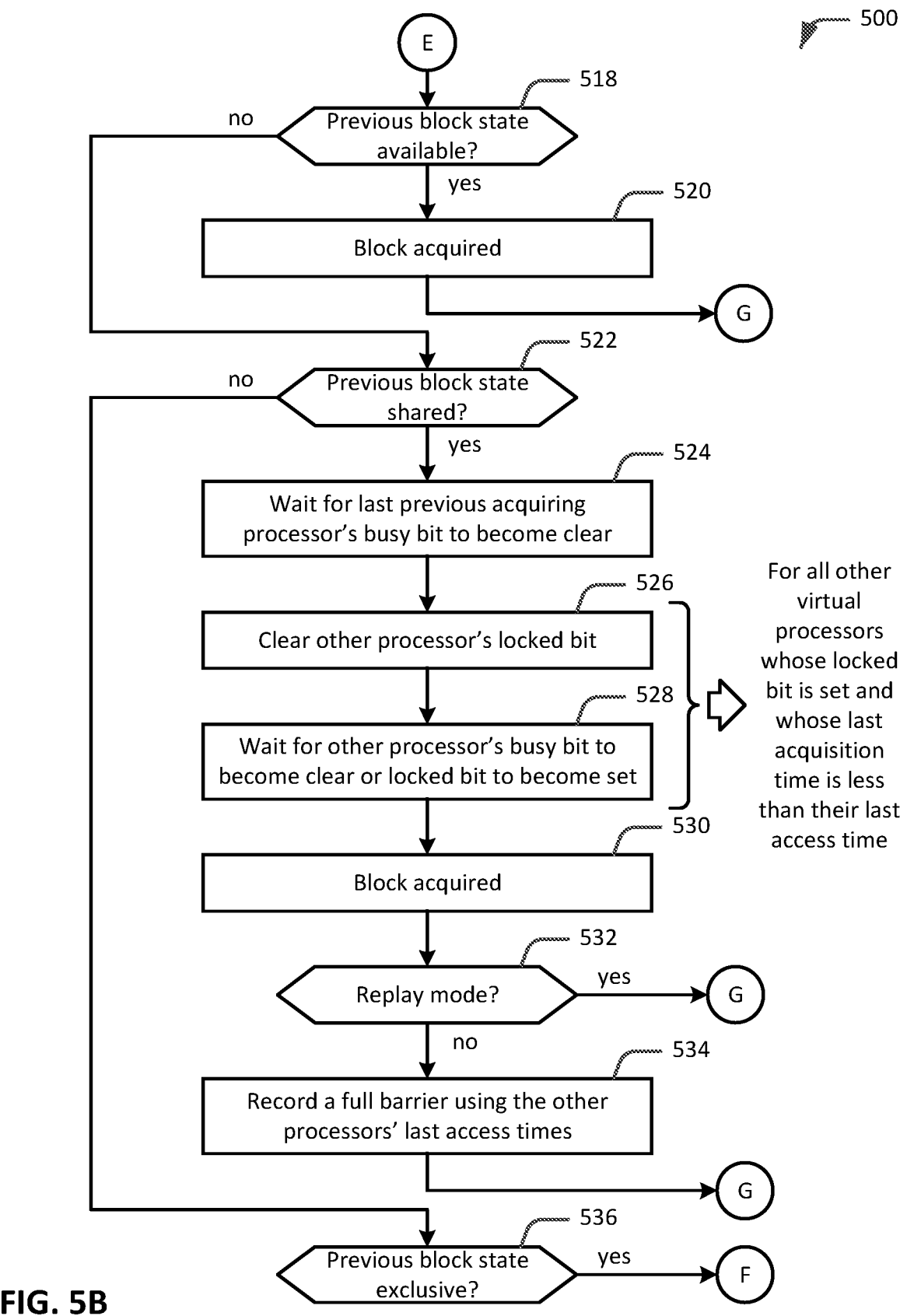
Figure 5C:
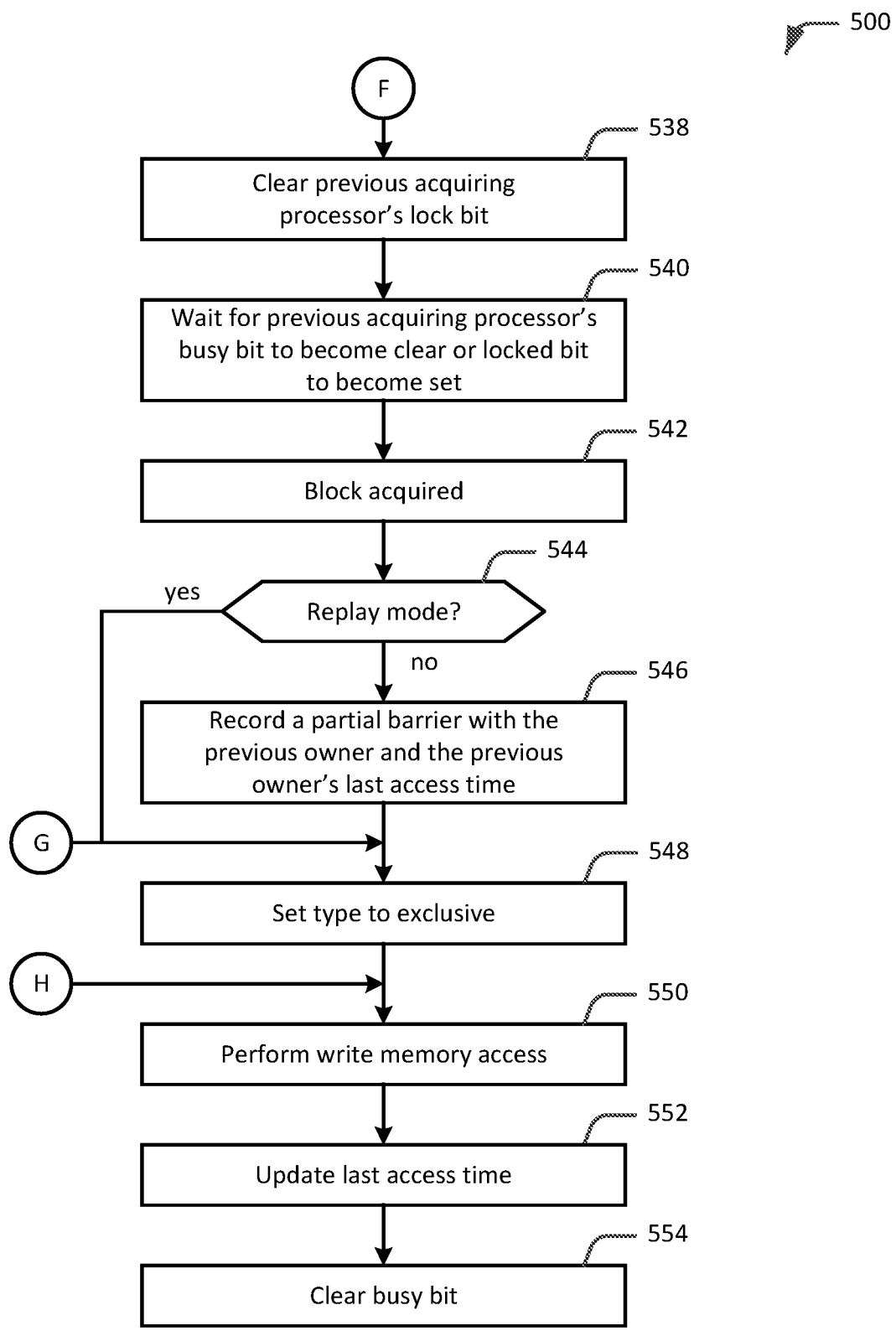
Figure 6:
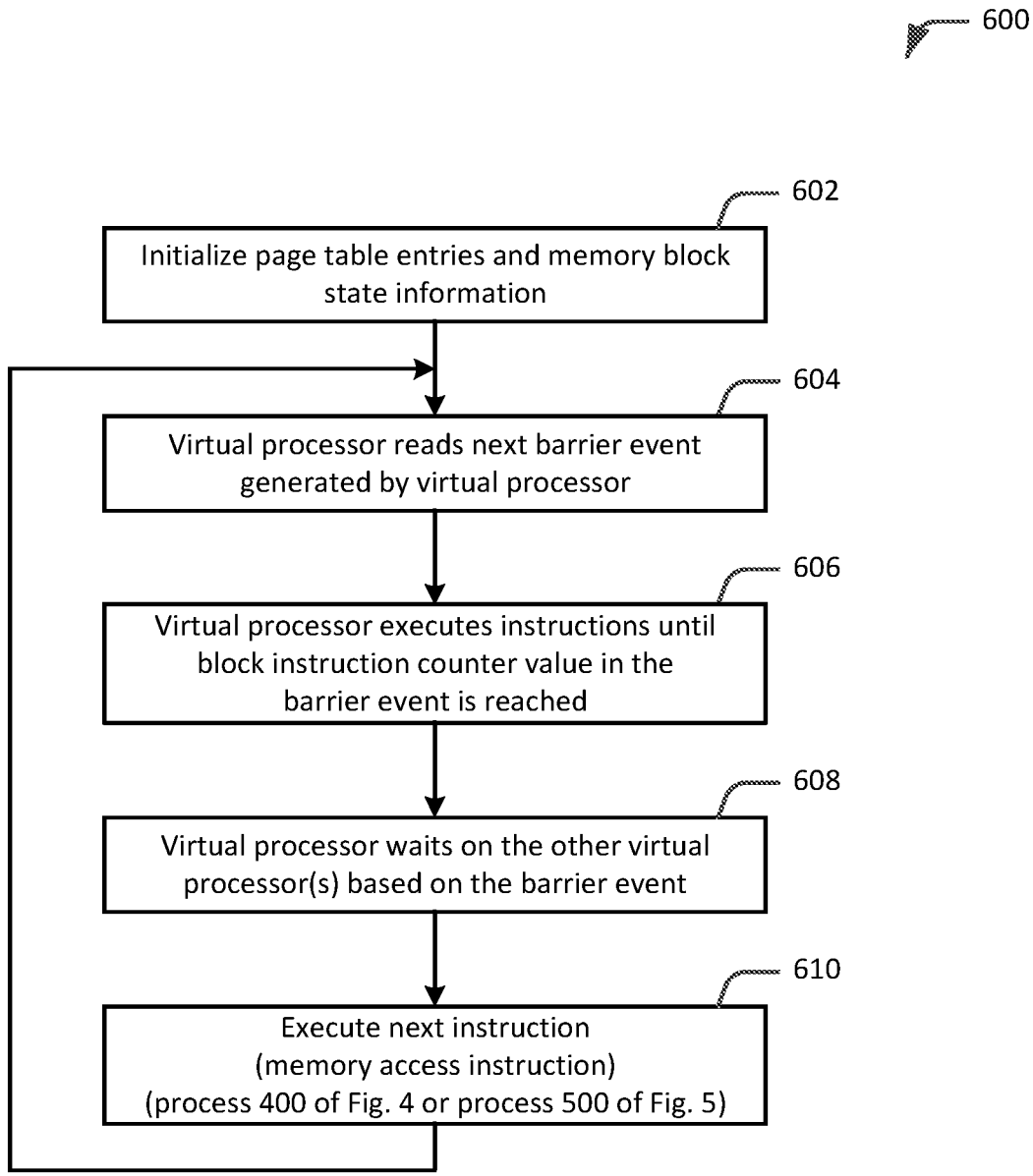
FIG. 6 is a flow diagram illustrating an example process for deterministically recreating memory accesses during execution replay, in accordance with an embodiment of the present disclosure.

FIGS. 5A-C are flow diagrams of an example process 500 for interposing on a write memory access, in accordance with an embodiment of the present disclosure. In particular, the flow diagrams illustrate interposing on a virtual processor attempting to perform a write memory access. In brief, in an implementation, a virtual processor (e.g., VCPU 116) may attempt a write memory access, in which case a memory management component (e.g., virtual memory manager 108) may enforce access rights. In the case of a violation (e.g., VCPU 116 does not have the proper access rights), VCPU 116 may be paused, and the virtualization system (e.g., virtualization system 100) may interpose to complete the write memory access (e.g., acquire the page, record barrier events, etc.).

Note that numerous operations of process 500 are substantially similar to operations of process 400 previously described. Unless context dictates otherwise, certain details of those operations of process 500 that are substantially similar to corresponding operations of process 400 will not be described again for the purposes of clarity.

With reference to process 500, at operation 502, VCPU 116 may identify a particular block state data structure (e.g., block state data structure 230) that is associated with a virtual memory block (e.g., block 212, 214, 216, or 218) that includes the memory that is being accessed by the write memory access instruction.

At operation 504, VCPU 116 may set its BUSY bit in the identified block state data structure 230 to indicate that VCPU 116 is interacting with that particular block state data structure 230. The virtual memory block associated with the identified block state data structure 230 is also referred to herein in the description of process 500 as the "associated virtual memory block" for brevity.

At operation 506, VCPU 116 may check its LOCKED bit in the identified block state data structure 230 to determine whether it has acquired access to the associated virtual memory block. This LOCKED bit being set indicates that VCPU 116 currently has access (e.g., 'Shared' or 'Exclusive') to the associated virtual memory block. The LOCKED bit being clear (i.e., not set) is an indication that VCPU 116 needs to acquire access to the associated virtual memory block to perform the write memory access. However, even in the case where this LOCKED bit is set, VCPU 116 needs to check whether it has the necessary access rights (i.e., 'Exclusive' access) to perform the write memory access.

If VCPU 116 determines that its LOCKED bit in the identified block state data structure 230 is set, then at operation 508, VCPU 116 may check its TYPE value in the identified block state data structure 230 to determine whether it has the necessary access rights to perform the write memory access. If VCPU 116 determines that its TYPE value in the identified block state data structure 230 indicates 'Exclusive', VCPU 116 may determine (i.e., conclude) that it has the necessary access rights and proceed with executing the write memory access instruction, at operation 550.

Otherwise, if VCPU 116 determines that its LOCKED bit in the identified block state data structure 230 is clear or its TYPE value in the identified block state data structure 230 does not indicate 'Exclusive', then at operation 510, VCPU 116 may update its LAST_ACQUIRED value in the identified block state data structure 230 to its current instruction counter value. The current instruction counter value is the instruction counter value of or otherwise associated with the write memory access instruction that is being executed by VCPU 116. VCPU 116 may update its LAST_ACQUIRED value to indicate the instruction counter value (e.g., time) at which VCPU 116 is attempting to acquire access to the associated virtual memory.

At operation 512, VCPU 116 may set the STATE value in the identified block state data structure 230 to 'Exclusive'. VCPU 116 may set the STATE to 'Exclusive' as an indication that an attempt is being made to acquire exclusive access rights to the associated virtual memory block.

At operation 514, VCPU 116 may set the OWNER value in the identified block state data structure 230 to itself (e.g., a specific CPU_ID that identifies VCPU 116) as an indication that VCPU 116 is attempting to (wants to) acquire exclusive access rights to the associated virtual memory block. At operation 516, VCPU 116 may update the ACQUIRED_CTR value in the identified block state data structure 230 to its current instruction counter value as an indication that VCPU 116 was executing an instruction associated with the instruction counter value when VCPU 116 acquired exclusive access rights to the associated virtual memory block.

At operation 518, VCPU 116 may check to determine whether the previous state of the associated virtual memory block was 'Available'. If VCPU 116 determines that the previous state of the associated virtual memory block was 'Available' (i.e., previous STATE value in the identified block state data structure 230 was 'Available'), then at operation 520, VCPU 116 may determine that it has acquired exclusive access rights to the associated virtual memory block. VCPU 116 may set its LOCKED bit (e.g., the LOCKED bit associated with VCPU 116 in the identified block state data structure 230) to indicate that it has acquired access rights to the associated virtual memory block. VCPU 116 may then proceed with executing the write memory access instruction, at operation 548.

Otherwise, if VCPU 116 determines that the previous state of the associated virtual memory block was not 'Available', then at operation 522, VCPU 116 may check to determine whether the previous state of the associated virtual memory block was 'Shared'. If VCPU 116 determines that the previous state of the associated virtual memory block was 'Shared', then at operation 524, VCPU 116 may wait for the last previous acquiring virtual processor's BUSY bit to become clear. VCPU 116 may wait for the last previous acquiring virtual processor's BUSY bit (e.g., the BUSY bit associated with the last previous acquiring virtual processor in the identified block state data structure 230) to become clear, which is an indication that the last previous acquiring virtual processor has completed or otherwise finished interacting with the associated virtual memory block. In an implementation, VCPU 116 may cease or otherwise stop executing instructions (e.g., block itself) while waiting for the last previous acquiring virtual processor's BUSY bit to become clear.

Once the last previous acquiring virtual processor's BUSY bit becomes clear, at operation 526, VCPU 116 may clear the other virtual processor's LOCKED bit. The other virtual processor in this instance is another virtual processor that is provisioned to execute within guest VM 110 (e.g., VCPU 116-1 or VCPU 116-2). VCPU 116 may clear the other virtual processor's LOCK bit (e.g., the LOCKED bit associated with the other virtual processor in the identified block state data structure 230) as an indication that the other virtual processor no longer has acquired shared access to the associated virtual memory block.

At operation 528, VCPU 116 may wait for the other virtual processor's BUSY bit to become clear or the other virtual processor's LOCKED bit to become set. The other virtual processor's BUSY bit becoming clear indicates that the other virtual processor has completed or otherwise finished interacting with the associated virtual memory block. The other virtual processor's LOCKED bit becoming set indicates that the other virtual processor has again acquired access rights to the associated virtual memory block. The LOCKED bit being set suggests that an acquisition occurred while we were waiting, and further suggests that the BUSY bit will shortly become cleared as the acquisition has completed, and therefore VCPU 116 can proceed. This condition holds because, at preceding operation 526, VCPU 116 clears the other virtual processor's LOCKED bit. So, if the LOCKED bit has been cleared, and the LOCKED bit becomes subsequently locked (i.e., relocked), then VCPU 116 knows the precise state of the other virtual processor and can proceed.

VCPU 116 may repeat operations 526 and 528 for the other virtual processors provisioned to execute within guest VM 110 whose LOCKED bit (e.g., the respective LOCKED bit associated with each of the other virtual processors in the identified block state data structure 230) is set and whose last acquisition time (e.g., the respective LAST_ACQUIRED value associated with each of the other virtual processors in the identified block state data structure 230) is less than their last access time (e.g., the respective LAST_ACCESS value associated with each of the other virtual processors in the identified block state data structure 230). A virtual processor's last acquisition time being less than its last access time in a block state data structure is an indication that the virtual processor has not yet interacted with the virtual memory block associated with the block state data structure. Thus, in this instance, VCPU 116 is waiting for the other virtual processors that have shared access rights to the associated virtual memory block to interact with the associated virtual memory block.

Once the other virtual processors' corresponding BUSY bits become clear or the other virtual processors' corresponding LOCKED bits become set, at operation 530, VCPU 116 may determine that it has acquired exclusive access rights to the associated virtual memory block. VCPU 116 may set its LOCKED bit (e.g., the LOCKED bit associated with VCPU 116 in the identified block state data structure 230) to indicate that it has acquired access rights to the associated virtual memory block.

At operation 532, VCPU 116 may optionally check to determine whether VCPU 116 is executing in replay mode. In replay mode, VCPU 116 does not need to record the virtual processor ordering constraints associated with acquiring the associated virtual memory block (e.g., the identified block state data structure 230 transitions). However, in non-replay mode (i.e., live mode), VCPU 116 records the respective states of the other virtual processors (e.g., VCPU 116-1 and VCPU 116-2) when the acquiring virtual processor (e.g., VCPU 116) acquired exclusive access rights to the associated virtual memory block.

If VCPU 116 determines that it is executing in non-replay mode, then at operation 534, VCPU 116 may generate a full barrier event data structure (e.g. full barrier event data structure 250) to record a full barrier event. VCPU 116 may record a full barrier event because the previous state of the associated virtual memory block was 'Shared'. In full barrier event data structure 250, VCPU 116 may set the Block State Identifier value to identify the identified block state data structure 230, the block_cpu value to itself (e.g., a specific CPU_ID that identifies VCPU 116), and the block_counter value to its current instruction counter value. The current instruction counter value is the instruction counter value of the write memory access instruction that is being executed by VCPU 116. VCPU 116 may then, for each of the other virtual processors, set the target_cpu value to identify a particular one of the other virtual processor (e.g., a specific CPU_ID of the particular one of the other virtual processor) and set the target_counter value to the particular one of the other virtual processor's last access time (e.g., the LAST_ACCESS value associated with the particular one of the other virtual processor in the identified block state data structure 230). In an implementation, VCPU 116 may include the generated full barrier event data structure 240 in its barrier log (e.g., barrier log 260).

Otherwise, if VCPU 116 determines that it is executing in replay mode or once VCPU 116 records a full barrier event, VCPU 116 may proceed with executing the write memory access instruction, at operation 548.

Otherwise, if VCPU 116 determines that the previous state of the associated virtual memory block was not 'Available' or 'Shared', then at operation 536, VCPU 116 may check to determine whether the previous state of the associated virtual memory block was 'Exclusive'. If VCPU 116 determines that the previous state of the associated virtual memory block was 'Exclusive', then at operation 538, VCPU 116 may clear the previous acquiring processor's LOCKED bit. Note that in the 'Exclusive' state, the previous acquiring processor is the only virtual processor that may have exclusive access rights to the associated virtual memory block. VCPU 116 may clear the previous acquiring processor's LOCKED bit (e.g., the LOCKED bit associated with the previous acquiring processor in the identified block state data structure 230) as an indication that the previous acquiring processor no longer has acquired exclusive access rights to the associated virtual memory block.

At operation 540, VCPU 116 may wait for the previous acquiring virtual processor's BUSY bit to become clear or the previous acquiring processor's LOCKED bit to become set. The LOCKED bit being set suggests that an acquisition occurred while we were waiting, and further suggests that the BUSY bit will shortly become cleared as the acquisition has completed, and therefore VCPU 116 can proceed. This condition holds because, at preceding operation 538, VCPU 116 clears the previous acquiring processor's LOCKED bit. So, if the LOCKED bit has been cleared, and the LOCKED bit becomes subsequently locked (i.e., relocked), then VCPU 116 knows the precise state of the previous acquiring virtual processor and can proceed.

Once the previous acquiring virtual processor's BUSY bit becomes clear or the previous acquiring processor's LOCKED bit becomes set, at operation 542, VCPU 116 may determine that it has acquired exclusive access rights to the associated virtual memory block. VCPU 116 may set its LOCKED bit (e.g., the LOCKED bit associated with VCPU 116 in the identified block state data structure 230) to indicate that it has acquired access rights to the associated virtual memory block. At operation 544, VCPU 116 may optionally check to determine whether VCPU 116 is executing in replay mode.

If VCPU 116 determines that it is executing in non-replay mode, then at operation 546, VCPU 116 may generate a partial barrier event data structure (e.g. partial barrier event data structure 240) to record a partial barrier event. VCPU 116 may record a partial barrier event because the previous state of the associated virtual memory block was 'Exclusive'. In partial barrier event data structure 240, VCPU 116 may set the Block State Identifier value to identify the identified block state data structure 230, the block_cpu value to itself (e.g., a specific CPU_ID that identifies VCPU 116), and the block_counter value to its current instruction counter value. The current instruction counter value is the instruction counter value of the write memory access instruction that is being executed by VCPU 116. Because the previous state of the associated virtual memory block was 'Exclusive', VCPU 116 may set the target_cpu value to identify the previous exclusive owner of the associated virtual memory block (e.g., the virtual processor indicated by the LAST_WRITER value in the identified block state data structure 230) and set the target_counter value to the previous exclusive owner's last access of the associated virtual memory block (e.g., the instruction counter value indicated by the LAST_WRITE value in the identified block state data structure 230) in partial barrier event data structure 240. In an implementation, VCPU 116 may include the generated partial barrier event data structure 240 in its barrier log (e.g., barrier log 260).

Otherwise, if VCPU 116 determines that it is executing in replay mode or once VCPU 116 records a partial barrier event, VCPU 116 may proceed with executing the write memory access instruction, at operation 548.

At operation 548, VCPU 116 may set its TYPE value in the identified block state data structure 230 to 'Exclusive'. In this instance, since its LOCKED bit is set, setting the TYPE to 'Exclusive' is an indication that VCPU 116 has acquired exclusive access rights to the associated virtual memory block.

At operation 550, VCPU 116 may execute the write memory access instruction. For example, as part of executing the write memory access instruction, VCPU 116 may attempt to map the associated virtual memory block into its virtual page table (e.g., virtual memory page table 202). Once the appropriate memory page is successfully mapped into its virtual memory page table 202, VCPU 116 can proceed with executing the write memory access instruction.

At operation 552, VCPU 116 may update its LAST_ACCESS value in the identified block state data structure 230 to its current instruction counter value. The current instruction counter value is the instruction counter value of or otherwise associated with the write memory access instruction that is being executed by VCPU 116. VCPU 116 may update its LAST_ACCESS value to indicate the instruction counter value (e.g., time) at which VCPU 116 last successfully accessed (e.g., wrote) the associated virtual memory block.

At operation 554, VCPU 116 may clear its BUSY bit in the identified block state data structure 230 to indicate that VCPU 116 is no longer interacting with the identified block state data structure 230. In an implementation, the BUSY bit being cleared may also serve as an indication that VCPU 116 has completed or otherwise finished interacting with the virtual memory block associated with the identified block state data structure 230.

FIG. 6 is a flow diagram illustrating an example process 600 for deterministically recreating memory accesses during execution replay, in accordance with an embodiment of the present disclosure. In particular, the execution replay may be of a multicore VM instance (e.g., VCPU 116 of guest VM 110 shown and described above in conjunction with FIG. 1) for which barrier events were recorded as variously described herein during a live execution of the multicore VM. For example, as shown in FIG. 1, guest VM 110 may have provisioned 2 virtual processors, VCPU 116-1 and VCPU 116-2, and VCPU 116-1 and VCPU 116-2 may be executing respective instruction streams during replay of guest VM 110. As such, in this context, VCPU 116 may refer to either VCPU 116-1 or VCPU 116-2.

With reference to process 600, at operation 602, the page table entries (e.g., page table entries 272 in page table 270) and virtual memory block state information (e.g., block state data structures 230) may be initialized to a known state. For example, at the start of the replay, block state data structures 230 may be initialized to indicate that the associated virtual memory blocks (e.g., blocks 212-218 of virtual memory 114) are available. Note that the replay may be stopped and/or started at various points during the execution replay of guest VM 110. For example, debugging may involve starting and stopping execution at various points in the execution replay. At the start (or restart) of the execution replay of guest VM 110, the page table entries and the virtual memory block information (i.e., the state of the virtual processors provisioned to execute within guest VM 110) are initialized to a desired state.

At operation 604, VCPU 116 may read a next barrier event (e.g., partial barrier event data structure 240 or full barrier event data structure 250) from its barrier log (e.g., barrier log 260). As previously described, the block_counter indicates an instruction counter value of a virtual processor at which point in the execution of the instruction stream (at which time) the virtual processor is to be blocked. The next barrier event is a barrier event that is yet to be processed by VCPU 116 and which has the smallest block_counter value amongst the barrier events yet to be processed. In other words, the next barrier event is a barrier event that (1) has a block_counter value that is larger than the current instruction counter value of VCPU 116, and (2) has a block_counter value that is the smallest relative to the block_counter values of other barrier events having block_counter values larger than the current instruction counter value of VCPU 116. For example, suppose VCPU 116 is currently executing an instruction associated with instruction counter value 300. Also suppose VCPU's 116 barrier log 260 includes three barrier events A, B, and C, and that barrier event A has a block_counter value of 200, barrier event B has a block_counter value of 350, and barrier event C has a block_counter value of 425. In this example case, barrier event B is the next barrier event read by VCPU 116.

At operation 606, VCPU 116 may execute (e.g., continue to execute) instructions in its instruction stream until the block instruction counter value (i.e., block_counter value) specified in the read barrier event is reached. Continuing the above example, since the block instruction counter value specified in barrier event B is 350, VCPU 116 may continue to execute instructions (e.g., instructions corresponding to instruction counter values 301 to 349) until its instruction counter value reaches 350.

At operation 608, once its instruction counter value reaches the block instruction counter value, VCPU 116 may stop (cease) executing instructions in its instruction stream and wait on the other virtual processors as specified by the read barrier event. For example, if the read barrier event is a partial barrier event data structure, VCPU 116 blocks itself from executing instructions until another virtual processor (i.e., a virtual processor identified by target_cpu value in the partial barrier event data structure) reaches or passes a specified instruction counter value (i.e., an instruction counter specified by target_counter value in the partial barrier event data structure) in the other virtual processor's instruction execution. If the read barrier event is a full barrier event data structure, VCPU 116 blocks itself from executing instructions until the other virtual processors (i.e., all virtual processors identified by target_cpu values in the full barrier event data structure) reaches or passes corresponding specified instruction counter values (i.e., instruction counter specified by corresponding target_counter values in the partial barrier event data structure) in the other virtual processors' instruction execution. Once the virtual processor ordering constraints specified in the read barrier event are satisfied, VCPU 116 may resume executing instructions. For example, VCPU 116 may execute the next instruction in its instruction stream (e.g., instruction corresponding to instruction counter value 350 in the above example). Note that the next instruction to be executed by VCPU 116 is a nondeterministic instruction (e.g., memory access instruction). In this manner, the read barrier event allows VCPU 116 to synchronize its instruction execution against the other virtual processors running within guest VM 110 prior to executing a nondeterministic instruction to provide determinism during replay of guest VM 110.

At operation 610, once the constraints specified in the read barrier event are satisfied, VCPU 116 may execute the next instruction in its instruction stream. For example, in an embodiment, if the next instruction is a read memory access instruction, VCPU may perform process 400 previously described in conjunction with FIGS. 4A-4D to execute the read memory access instruction. If the next instruction is a write memory access instruction, VCPU may perform process 500 previously described in conjunction with FIGS. 5A-5C to execute the write memory access instruction.

Once the next instruction is executed, VCPU 116 may return to operation 604 to read the next barrier event from its barrier log 260.

Figure 7:
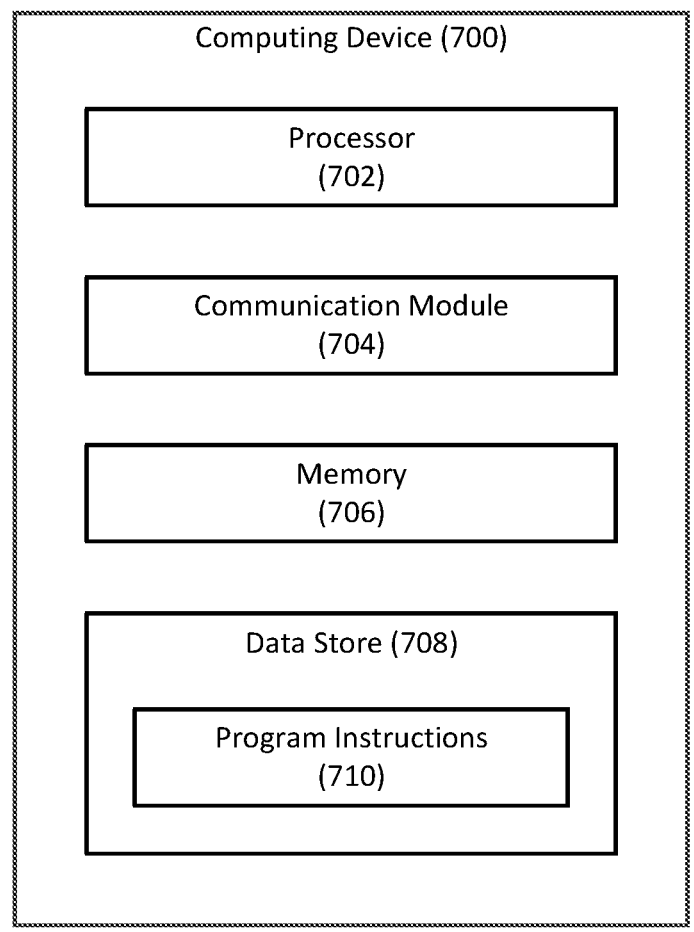
FIG. 7 illustrates selected components of an example computing device that may be used to perform any of the techniques as variously described in the present disclosure, in accordance with an embodiment of the present disclosure.

FIG. 7 illustrates selected components of an example computing device 700 that may be used to perform any of the techniques as variously described in the present disclosure, in accordance with an embodiment of the present disclosure. In some embodiments, computing device 700 may be configured to implement or direct one or more operations associated with some or all of the engines, components, and/or modules associated with computing system 100 of FIG. 1. For example, virtualization system 100 including virtual memory manager 108, or any combination of these may be implemented in and/or using computing device 700. In one example case, for instance, each of virtualization system 100 including virtual memory manager 108 may be stored on a data store 708, loaded in memory 706, and executable by a processor 702.

In some embodiments, computing device 700 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. In some embodiments, a distributed computational system may be provided comprising multiple of such computing devices. As shown in FIG. 7, computing device 700 includes processor 702, a communication module 704, memory 706, and data store 708. Processor 702, communication module 704, memory 706, and data store 708 may be communicatively coupled. In various embodiments, additional components (not illustrated, such as a display, communication interface, input/output interface, etc.) or a subset of the illustrated components can be employed without deviating from the scope of the present disclosure.

Processor 702 may be designed to control the operations of the various other components of computing device 700. Processor 702 may include any processing unit suitable for use in computing device 700, such as a single core or multi-core processor. In general, processor 702 may include any suitable special-purpose or general-purpose computer, computing entity, or computing or processing device including various computer hardware, or firmware, and may be configured to execute instructions, such as program instructions, stored on any applicable computer-readable storage media. For example, processor 702 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi-core, or any other digital or analog circuitry configured to interpret and/or to execute program instructions and/or to process data, whether loaded from memory or implemented directly in hardware. Although illustrated as a single processor in FIG. 7, processor 702 may include any number of processors and/or processor cores configured to, individually or collectively, perform or direct performance of any number of operations described in the present disclosure.

In some embodiments, processor 702 may be configured to interpret and/or execute program instructions and/or process data stored in memory 706, data store 708, or memory 706 and data store 708. In some embodiments, processor 702 may fetch program instructions from data store 708 and load the program instructions in memory 706. After the program instructions are loaded into memory 706, processor 702 may execute the program instructions.

For example, in some embodiments, any one or more of the engines, components and/or modules of computing system 100 may be included in data store 708 as program instructions 710. For example, in such embodiments, program instructions 710 cause computing device 700 to implement functionality in accordance with the various embodiments and/or examples described herein. Processor 702 may fetch some or all of program instructions 710 from data store 708 and may load the fetched program instructions 710 in memory 706. Subsequent to loading the fetched program instructions 710 into memory 708, processor 702 may execute program instructions 710 such that a virtualization system, such as virtualization system 100, and/or guest VMs, such as guest VM 110, are generated and operate on computing device 700 as variously described herein.

In some embodiments, virtualization may be employed in computing device 700 so that infrastructure and resources in computing device 700 may be shared dynamically. For example, a VM may be provided to handle a process running on multiple processors so that the process appears to be using only one computing resource rather than multiple computing resources. Multiple VMs may also be used with one processor.

Communication module 704 can be any appropriate network chip or chipset which allows for wired or wireless communication via a network, such as, by way of example, a local area network (e.g., a home-based or office network), a wide area network (e.g., the Internet), a peer-to-peer network (e.g., a Bluetooth connection), or a combination of such networks, whether public, private, or both. Communication module 704 can also be configured to provide intra-device communications via a bus or an interconnect.

Memory 706 may include computer-readable storage media configured for carrying or having computer-executable instructions or data structures stored thereon. Such computer-readable storage media may include any available media that may be accessed by a general-purpose or special-purpose computer, such as processor 702. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media.

Data store 708 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium, including those provided above in conjunction with memory 706, which may be used to carry or store particular program code in the form of computer-readable and computer-executable instructions, software or data structures for implementing the various embodiments as disclosed herein and which may be accessed by a general-purpose or special-purpose computer. Combinations of the above may also be included within the scope of computer-readable storage media. Computer-executable instructions may include, for example, instructions and data configured to cause processor 702 to perform a certain operation or group of operations. Data store 708 may be provided on computing device 700 or provided separately or remotely from computing device 700.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method comprising:
    starting an execution replay of a multicore virtual machine (VM) instance that was previously executed, the multicore VM instance including a plurality of virtual processors, at least one virtual processor of the virtual processors configured to execute instructions in an instruction stream;
    initializing states of the plurality of virtual processors; and
    by the at least one virtual processor
        reading a barrier event generated by the at least one virtual processor during a previous execution of the multicore VM instance, wherein the barrier event specifies at least one constraint and a block instruction counter value; and
        executing one or more instructions in the instruction stream based on at least one of:
            the at least one constraint or the block instruction counter value.

2. The computer-implemented method of claim 1, wherein executing the one or more instructions in the instruction stream based on at least one of the at least one constraint or the block instruction counter value comprises:
    executing one or more instructions in the instruction stream until the block instruction counter value is reached;
    ceasing execution of instructions in the instruction stream until the at least one constraint is satisfied; and
    responsive to the at least one constraint being satisfied, executing a next instruction in the instruction stream.

3. The computer-implemented method of claim 2, further comprising, upon executing the next instruction, reading, by the at least one virtual processor, a next barrier event generated by the at least one virtual processor during the previous execution of the multicore VM instance.

4. The computer-implemented method of claim 2, wherein the next instruction is a nondeterministic instruction.

5. The computer-implemented method of claim 1, wherein the barrier event was recorded during execution of a nondeterministic instruction during the previous execution of the multicore VM instance.

6. The computer-implemented method of claim 5, wherein the nondeterministic instruction comprises a read memory access instruction.

7. The computer-implemented method of claim 5, wherein the nondeterministic instruction comprises a write memory access instruction.

8. The computer-implemented method of claim 1, wherein the execution replay of the VM instance is in an emulation execution environment.

9. The computer-implemented method of claim 1, wherein the barrier event comprises a partial barrier event.

10. The computer-implemented method of claim 1, wherein the barrier event comprises a full barrier event.

11. A computer program product including one or more non-transitory machine readable mediums encoded with instructions that when executed by one or more processors cause a process to be carried out to interpose on nondeterministic events during multicore virtual machine (VM) execution, the process comprising:
    starting an execution of a multicore virtual machine (VM) instance, the multicore VM instance including a plurality of virtual processors, at least one virtual processor of the virtual processors configured to execute instructions in an instruction stream;
    reading, by the at least one virtual processor, an instruction to execute; and
    responsive to a determination that the instruction is a nondeterministic instruction, interposing, by the at least one virtual processor, on the nondeterministic instruction execution so as to allow deterministic execution of the nondeterministic instruction during replay execution of the multicore VM instance, wherein the nondeterministic instruction comprises an access of a virtual memory block.

12. The computer program product of claim 11, wherein the execution of the VM instance is in an emulation execution environment.

13. The computer program product of claim 11, wherein the nondeterministic instruction comprises a read memory access instruction on the virtual memory block, and wherein interposing on the nondeterministic instruction execution further comprises acquiring shared access rights to the virtual memory block.

14. The computer program product of claim 13, wherein acquiring shared access rights to the virtual memory block comprises recording a partial barrier event, wherein the partial barrier event includes an indication of a time at which the virtual processor is to be blocked during execution replay of the multicore VM instance.

15. The computer program product of claim 11, wherein the nondeterministic instruction comprises a write memory access instruction on the virtual memory block, and wherein interposing on the nondeterministic instruction execution further comprises acquiring exclusive access rights to the virtual memory block.

16. The computer program product of claim 15, wherein acquiring exclusive access rights to the virtual memory block comprises recording a partial barrier event, wherein the partial barrier event includes an indication of a time at which the virtual processor is to be blocked during execution replay of the multicore VM instance.

17. The computer program product of claim 15, wherein acquiring exclusive access rights to the virtual memory block comprises recording a full barrier event, wherein the full barrier event includes an indication of a time at which the virtual processor is to be blocked during execution replay of the multicore VM instance.

18. A system comprising:
one or more non-transitory machine-readable mediums configured to store instructions; and
one or more processors configured to execute the instructions stored on the one or more non-transitory machine-readable mediums, wherein execution of the instructions causes the one or more processors to
start an execution replay of a multicore virtual machine (VM) instance that was previously executed, the multicore VM instance including a plurality of virtual processors, at least one virtual processor of the virtual processors configured to execute instructions in an instruction stream;
initialize states of the plurality of virtual processors; and
cause the at least one virtual processor to
read a barrier event generated by the at least one virtual processor during a previous execution of the multicore VM instance, wherein the barrier event specifies at least one constraint and a block instruction counter value; and
execute one or more instructions in the instruction stream based on at least one of: the at least one constraint or the block instruction counter value.

19. The system of claim 18, wherein to execute the one or more instructions in the instruction stream based on at least one of the at least one constraint or the block instruction counter value comprises:
execute one or more instructions in the instruction stream until the block instruction counter value is reached;
cease execution of instructions in the instruction stream until the at least one constraint is satisfied; and
responsive to the at least one constraint being satisfied, execute a next instruction in the instruction stream.

20. The system of claim 18, wherein the barrier event is a partial barrier event or a full barrier event.

* * * * *